United States Patent
Suzue et al.

(10) Patent No.: US 10,562,018 B2
(45) Date of Patent: Feb. 18, 2020

(54) ELECTRODE CATALYST, AND MEMBRANE ELECTRODE ASSEMBLY AND FUEL CELL USING ELECTRODE CATALYST

(71) Applicants: NISSAN MOTOR CO., LTD., Yokohama-shi, Kanagawa (JP); TANAKA KIKINZOKU KOGYO K.K., Tokyo (JP); NIPPON STEEL CHEMICAL & MATERIAL CO., LTD., Chiyoda-ku, Tokyo (JP)

(72) Inventors: Yoshinori Suzue, Kanagawa (JP); Kazuki Arihara, Kanagawa (JP); Tetsuya Mashio, Kanagawa (JP); Hiroyuki Tanaka, Kanagawa (JP); Katsuichiro Hayakawa, Kanagawa (JP); Koichi Matsutani, Kanagawa (JP); Hitoshi Nakajima, Kanagawa (JP)

(73) Assignees: NISSAN MOTOR CO., LTD., Yokohama-shi (JP); TANAKA KIKINZOKU KOGYO K.K., Tokyo (JP); NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 0 days.

(21) Appl. No.: 16/094,562

(22) PCT Filed: Apr. 6, 2017

(86) PCT No.: PCT/JP2017/014415
§ 371 (c)(1),
(2) Date: Oct. 18, 2018

(87) PCT Pub. No.: WO2017/183475
PCT Pub. Date: Oct. 26, 2017

(65) Prior Publication Data
US 2019/0336956 A1 Nov. 7, 2019

(30) Foreign Application Priority Data
Apr. 19, 2016 (JP) .................. 2016-083843

(51) Int. Cl.
*B01J 35/00* (2006.01)
*B01J 23/89* (2006.01)
(Continued)

(52) U.S. Cl.
CPC ....... *B01J 35/0046* (2013.01); *B01J 23/8913* (2013.01); *B01J 35/1028* (2013.01);
(Continued)

(58) Field of Classification Search
None
See application file for complete search history.

(56) References Cited

U.S. PATENT DOCUMENTS

2009/0233135 A1 9/2009 Horiuchi et al.
2013/0244137 A1 9/2013 Tada et al.
(Continued)

FOREIGN PATENT DOCUMENTS

CA 2910372 A1 10/2014
CA 2920832 A1 2/2015
(Continued)

*Primary Examiner* — Helen Oi K Conley
(74) *Attorney, Agent, or Firm* — Foley & Lardner LLP

(57) ABSTRACT

Provided is a catalyst that can exhibit high activity. The catalyst is an electrode catalyst having catalytic metals supported on a catalyst support, in which the catalytic metals include platinum and a metal component other than platinum; the electrode catalyst has mesopores having a mode radius of pore distribution of mesopores having a radius of 1 nm or more, of 1 nm or more and less than 2.5 nm; alloy microparticles of platinum and the metal component other than platinum are supported inside the mesopores; and a molar content ratio of platinum with respect to the metal component other than platinum in the alloy microparticles supported inside the mesopores is 1.0 to 10.0.

8 Claims, 1 Drawing Sheet

(51) Int. Cl.
*B01J 35/10* (2006.01)
*H01M 4/92* (2006.01)
*H01M 8/1004* (2016.01)
*H01M 4/88* (2006.01)

(52) U.S. Cl.
CPC ......... *H01M 4/8828* (2013.01); *H01M 4/921* (2013.01); *H01M 4/925* (2013.01); *H01M 8/1004* (2013.01); *B01J 35/1061* (2013.01)

(56) References Cited

U.S. PATENT DOCUMENTS

| | | |
|---|---|---|
| 2015/0295250 A1 | 10/2015 | Nagami et al. |
| 2016/0064744 A1 | 3/2016 | Mashio et al. |
| 2016/0079605 A1 | 3/2016 | Mashio et al. |
| 2016/0197358 A1 | 7/2016 | Arihara et al. |

FOREIGN PATENT DOCUMENTS

| | | |
|---|---|---|
| JP | 2005-135817 A | 5/2005 |
| JP | 2006-228502 A | 8/2006 |
| JP | 2008-290062 A | 12/2008 |
| JP | 2008-311055 A | 12/2008 |
| JP | 2010-198885 A | 9/2010 |
| JP | 2015-204216 | 11/2015 |
| WO | WO 2007/055411 A1 | 5/2007 |
| WO | WO 2014/060646 A | 4/2014 |
| WO | WO 2014/175100 A1 | 10/2014 |
| WO | WO 2014/175106 A1 | 10/2014 |
| WO | WO-2015/020079 A1 | 2/2015 |

ELECTRODE CATALYST, AND MEMBRANE ELECTRODE ASSEMBLY AND FUEL CELL USING ELECTRODE CATALYST

TECHNICAL FIELD

The present invention relates to an electrode catalyst, and a membrane electrode assembly and a fuel cell using the electrode catalyst.

BACKGROUND ART

In recent years, in response to social demands and movements arising from energy and environmental issues, a fuel cell capable of being operated at normal temperature to obtain high power density has been attracting attention as a power source for electric vehicles and as a stationary power source. A fuel cell is a clean power generation system wherein water is principally generated by an electrode reaction and there are almost no adverse impacts on the global environment. In particular, a polymer electrolyte fuel cell (PEFC) is anticipated to be a power source for electric vehicles because the PEFC is operated at a relatively low temperature.

Generally, the polymer electrolyte fuel cell has a structure wherein an electrolyte membrane-electrode assembly (MEA) is interposed by separators. The electrolyte membrane-electrode assembly is configured such that a polymer electrolyte membrane is interposed by a pair of electrode catalyst layers and a pair of gas diffusion electrodes (gas diffusion layers; GDLs).

In the polymer electrolyte fuel cell having the electrolyte membrane-electrode assembly as described above, an electrode reaction represented by the following reaction proceeds according to polarities of both electrodes (cathode and anode) interposing the solid polymer electrolyte membrane to yield electrical energy. First, hydrogen contained in a fuel gas supplied to the anode (negative electrode) side is oxidized by a catalyst component, to forma proton and an electron ($2H_2 \rightarrow 4H^+ + 4e^-$: Reaction 1). Next, the produced proton reaches a cathode (positive electrode)-side electrode catalyst layer through a solid polymer electrolyte contained in the electrode catalyst layer and the solid polymer electrolyte membrane contacting the electrode catalyst layer. In addition, the electron produced in the anode-side electrode catalyst layer reaches the cathode-side electrode catalyst layer through a conductive carrier constituting the electrode catalyst layer, a gas diffusion layer contacting the opposite side of the electrode catalyst layer to the solid polymer electrolyte membrane, a separator, and an external circuit. Then, the proton and the electron, which have reached the cathode-side electrode catalyst layer, react with oxygen contained in an oxidant gas supplied to the cathode side, to produce water ($O_2 + 4H^+ + 4e^- \rightarrow 2H_2O$: Reaction 2). In the fuel cell, electricity can be taken out to the outside through the above-described electrochemical reaction.

In order to improve power generation performance, improvement in activity of an electrode catalyst in the electrode catalyst layer is an important key. Conventionally, from the viewpoint of the improvement in the activity, platinum has been widely used as a catalyst metal of electrode catalyst. However, since the platinum is very expensive and is also a rare metal as a resource, there has been a need to develop a platinum alloy-based catalyst by reducing a content of platinum occupied in the catalyst particle while maintaining activity.

Regarding such a platinum alloy-based catalyst, WO 2014/060646 A discloses a catalyst having alloy microparticles supported inside mesopores, for which a mode radius of pore distribution of the mesopores having a radius of 1 to 10 nm is 2.5 to 10 nm.

SUMMARY OF INVENTION

Concerning the platinum alloy-based catalyst of WO 2014/060646 A, there is room for further increase of activity. Thus, an object of the present invention is to provide an electrode catalyst that can exhibit high activity.

Another object of the present invention is to provide an electrolyte membrane-electrode assembly and a fuel cell, both being formed using the electrode catalyst of the present invention.

The inventors of the present invention conducted a thorough investigation in order to solve the problems described above. As a result, the inventors found that when a mode radius of pore distribution of mesopores in an electrode catalyst is less than 2.5 nm, and in regard to catalytic metal particles existing inside the mesopores, when the content of metal components other than platinum is adjusted to a particular range, the problems described above can be solved.

BRIEF DESCRIPTION OF DRAWINGS

In FIG. 1, reference numeral 20 represents an electrode catalyst, reference numeral 22 represents a catalytic metal, reference numeral 23 represents a catalyst support, and reference numeral 24 represents a mesopore.

In FIG. 2, reference numeral 1 represents a polymer electrolyte fuel cell (PEFC); reference numeral 2 represents a solid polymer electrolyte membrane; reference numeral 3a represents an anode catalyst layer; reference numeral 3c represents a cathode catalyst layer; reference numeral 4a represents an anode gas diffusion layer; reference numeral 4c represents a cathode gas diffusion layer; reference numeral 5a represents an anode separator; reference numeral 5c represents a cathode separator; reference numeral 6a represents an anode gas passage; reference numeral 6c represents a cathode gas passage; reference numeral 7 represents a coolant passage; and reference numeral 10 represents an electrolyte membrane-electrode assembly (MEA).

DESCRIPTION OF EMBODIMENTS

Figure 1:
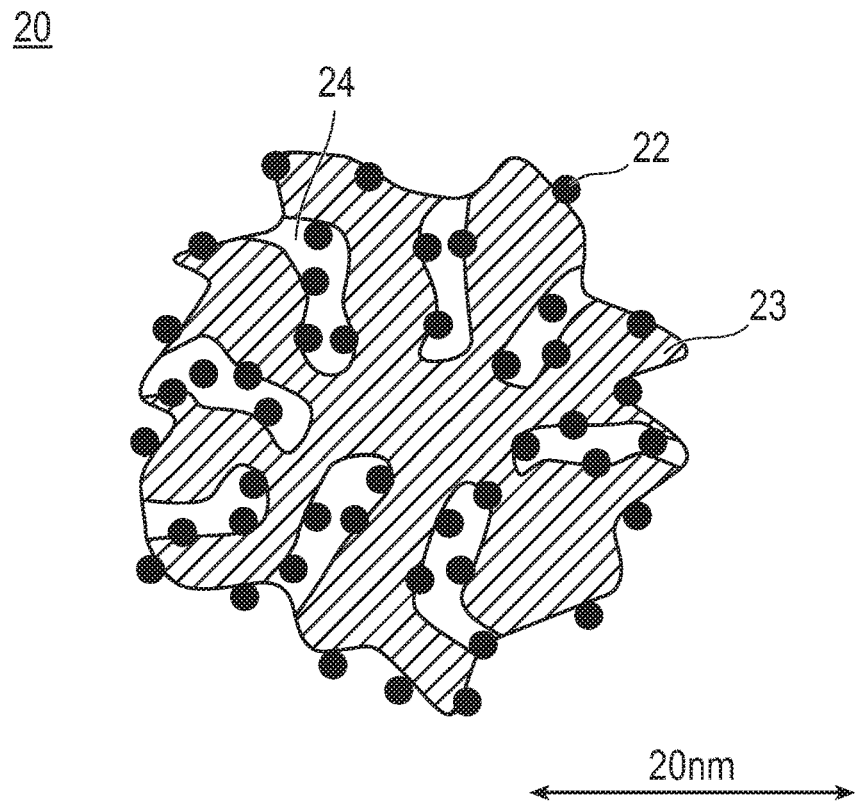
FIG. 1 is a schematic explanatory cross-sectional view illustrating a shape and structure of the electrode catalyst according to an embodiment of the present invention.

The electrode catalyst (in the present specification, also referred to as "catalyst") of the present invention includes a catalyst support and catalytic metals, and the catalytic metals are supported on the catalyst support. Then, the catalytic metals include platinum and metal components other than platinum. Here, the catalyst satisfies the following configurations (a) and (b): (a) the catalyst has pores having a radius of 1 nm or more (primary pores) (mesopores), while a mode radius of pore distribution of the mesopores is 1 nm or more and less than 2.5 nm; and (b) alloy microparticles of platinum and metal components other than platinum are supported inside the mesopores, while a molar content ratio of platinum with respect to the metal components other than platinum in the alloy microparticles supported inside the mesopores is 1.0 to 10.0.

According to the present invention, in the electrode catalyst in which the mode radius of pore distribution of mesopores is less than 2.5 nm, when platinum alloy-based particles containing a certain amount of a metal component other than platinum exist inside the mesopores, the catalytic activity is increased.

Hereinafter, a metal component other than platinum will be simply referred to as non-platinum metal. Furthermore, the mode radius of pore distribution of the mesopores will be simply referred to as "mode diameter of mesopores".

The above-described configurations (a) and (b) imply that in a catalyst in which the mode diameter of mesopores is 1 nm or more and less than 2.5 nm, alloy microparticles containing a particular amount of a non-platinum metal are supported inside the mesopores.

With regard to an electrode catalyst having mesopores with a small mode diameter as in the case of the above-described configuration (a), the inventors of the present invention found that when it was attempted to obtain a catalyst by loading platinum on a support, subsequently loading a non-platinum metal on the support, and then alloying the metals as described in WO 2014/060646 A, the catalytic activity did not increase to the assumed extent. As a cause for this, the present inventors paid attention to the composition of the catalyst particles inside the mesopores. With regard to the electrode catalyst having mesopores with a small mode diameter, when platinum particles are loaded on a support, subsequently a non-platinum metal is loaded on the support, and then the metals are subjected to alloying as described in WO 2014/060646 A, alloy microparticles are formed on the support surface. However, the inventors assumed that substantially only platinum particles are supported inside the mesopores, and this causes a decrease in the catalytic activity. Based on the assumption described above, the present inventors conceived the configuration of the present invention.

When the mode diameter of the mesopores is 1 nm or more and less than 2.5 nm, alloy microparticles exist inside the mesopores, and the alloy microparticles contain a particular amount of a non-platinum metal, catalyst performance markedly improves. When the mode diameter of the mesopores of the catalyst is less than 2.5 nm, it is more difficult for an electrolyte (electrolytic polymer) to penetrate into the mesopores compared to the case in which the mode diameter of the mesopores is 2.5 nm or more. Therefore, it is considered that the catalytic activity is enhanced compared to the case in which the mode diameter of the mesopores is 2.5 nm or more. Furthermore, it is considered that since alloy microparticles exist as a catalytic metal, the catalytic activity is enhanced as compared to simple platinum. It is also considered that by causing alloy microparticles to exist inside mesopores, the catalytic activity is further enhanced compared to the case in which alloy microparticles exist substantially only on the support surface. This is speculated to be due to the following mechanism. In a case in which alloy microparticles are supported on the support surface, the electrolyte (electrolytic polymer) can easily adsorb to the alloy microparticle surface compared to gases such as oxygen. Furthermore, when the alloy microparticles are brought into contact with the electrolyte (electrolytic polymer), reaction active area on the surface decreases, and consequently the catalytic activity is relatively lowered. In this regard, since it is difficult for the electrolyte to penetrate into the interior of the mesopores, a decrease in the reaction active area caused by adsorption of the electrolyte can be prevented by supporting the alloy microparticles inside the support. The penetration of the electrolyte (electrolytic polymer) can be further reduced by making the mode diameter of the mesopores small. In a three-phase interface, since water that may exist or be generated inside a fuel cell plays the role, the alloy microparticles existing inside the support can be effectively utilized. Furthermore, since alloy microparticles exhibit excellent catalytic activity, the amount of use of platinum can be reduced.

As described above, the electrode catalyst of the present invention can exhibit high activity (area specific activity (activity per unit surface area of platinum) and mass specific activity (activity per unit mass of platinum)), even if the electrode catalyst has a small platinum content. Accordingly, a membrane electrode assembly and a fuel cell, both using the electrode catalyst of the present invention in a catalyst layer, exhibit excellent power generation performance.

Hereinafter, an embodiment of an electrode catalyst according to the present invention and an embodiment of an electrolyte membrane-electrode assembly (MEA), and a fuel cell using such an electrode catalyst will be described in detail appropriately with reference to the drawings. However, the present invention is not limited to the following embodiments. In addition, each of the drawings may be expressed in an exaggerated manner for the convenience of description, and in each of the drawings, scaling factors of components may be different from actual values thereof. In addition, in the description of the embodiments of the present invention with reference to the drawings, the same components are denoted by the same reference numerals, and redundant description is omitted.

In this description, "X to Y" representing a range denotes "X or more and Y or less". Unless otherwise noted, operation and the measurement of physical properties are performed at a room temperature (20 to 25° C.) and a relative humidity of 40 to 50%.

[Electrode Catalyst (Hereinafter, Also Simply Referred to as Catalyst)]

A first embodiment of the present invention relates to an electrode catalyst in which catalytic metals are supported on a catalyst support, the electrode catalyst having mesopores having a radius of 1 nm or more, in which the mode radius of pore distribution of the mesopores is 1 nm or more and less than 2.5 nm, alloy microparticles formed from platinum and a metal component other than platinum are supported inside the mesopores as the catalytic metal, and the molar content ratio of platinum with respect to the metal component other than platinum in the alloy microparticles supported inside the mesopores is 1.0 to 10.0.

FIG. 1 is a schematic explanatory cross-sectional view illustrating a shape and structure of a catalyst according to an embodiment of the present invention. As illustrated in FIG. 1, an electrode catalyst 20 of the present embodiment includes catalytic metals 22 and a catalyst support 23. Furthermore, the electrode catalyst 20 has mesopores 24 having a radius of 1 nm or more. At this time, the mode diameter of the mesopores is 1 nm or more and less than 2.5 nm. The catalytic metals 22 supported inside the mesopores are substantially alloy microparticles containing platinum and a metal component other than platinum. Here, the term "substantially" implies that alloy microparticles occupy 80% by weight or more, more preferably 90% by weight or more, even more preferably 95% by weight or more, and particularly preferably 98% by weight or more (the upper limit 100% by weight) of the catalytic metal. Meanwhile, regarding the alloy microparticles, it is desirable that at least a portion of the alloy microparticles are supported inside the mesopores 24, and a portion of the alloy microparticles may be supported on the surface of the support 23.

The state in which "the alloy microparticles are supported inside the mesopores" can be checked by the following procedure. Catalytic metal particles exposed on the surface of the catalyst particles and the catalytic metal particles inside the mesopores are specified using scanning electron microscopy (SEM) and transmission electron microscopy (TEM). For each of the particles, the molar content ratio of the metal component is measured using EDX (energy dispersive X-ray spectroscopy), and it is confirmed that the alloy microparticles are alloy microparticles of platinum and a non-platinum metal.

Furthermore, regarding the "molar content ratio of platinum with respect to the metal component other than platinum in the alloy microparticles supported inside the mesopores", a value determined by similarly specifying ten to fifty catalytic metal particles inside the mesopores, measuring the molar content ratio of the metal component in the each of the particles to the second decimal place using EDX (energy dispersive X-ray spectroscopy), and then calculating the average molar content ratio, is employed. At this time, the average molar content ratio is determined to the second decimal place, and the second decimal digit is rounded off.

The molar content ratio of platinum with respect to the metal component other than platinum in the alloy microparticles supported inside the mesopores (hereinafter, the "molar content ratio of platinum with respect to the metal component other than platinum in the alloy microparticles supported inside the mesopores" is also simply referred to as "molar content ratio of platinum") is 1.0 to 10.0. The catalytic activity is markedly enhanced by adjusting the molar content ratio of platinum to such a range. From the viewpoint of catalytic activity, the molar content ratio of platinum is preferably 1.0 to 9.0, more preferably 2.5 to 8.5, and even more preferably 2.8 to 8.5.

The molar content ratio of platinum can be controlled by means of the feed amount of a non-platinum metal precursor used at the time of loading a non-platinum metal, the particle size of the platinum particles supported in the mesopores before loading of the non-platinum metal, the degree of hydrophilization of the support before loading of the non-platinum metal, the size of the mesopores of the support before loading of the non-platinum metal, or implement of a degassing treatment. As the feed amount of the non-platinum metal precursor becomes larger, the molar content ratio of platinum becomes smaller. As the particle size of the platinum particles supported in the mesopores is larger, alloying of the platinum particles and the non-platinum metal is promoted, and the molar content ratio of platinum becomes small. As the degree of hydrophilization of the support before loading of the non-platinum metal is higher, introduction of a non-platinum metal precursor liquid into the mesopores is likely to be accelerated, and alloying of the platinum particles and the non-platinum metal is accelerated. Thus, the molar content ratio of platinum becomes smaller. As the size of the mesopores of the support before loading of the non-platinum metal is larger, introduction of a non-platinum metal precursor liquid into the mesopores is likely to be accelerated, and alloying of the platinum particles and the non-platinum metal is accelerated. Thus, the molar content ratio of platinum becomes smaller. Furthermore, when a degassing treatment is carried out as necessary, introduction of a non-platinum metal precursor liquid into the mesopores is likely to be accelerated, and alloying of the platinum particles and the non-platinum metal is accelerated. Thus, the molar content ratio of platinum becomes smaller. Further, the control of the particle size of the platinum particles supported in the mesopores is achieved by performing a heat treatment after loading of the platinum particles and growing platinum particles, as will be described below; the particle size can be controlled by means of the feed amount of the platinum metal precursor used at the time of loading the platinum metal, or the like.

Furthermore, the average size (diameter) of the alloy microparticles inside the mesopores is preferably 2.0 nm or more, more preferably from 2.0 nm to 30.0 nm, even more preferably from 3.0 nm to 10.0 nm, still more preferably from 3.5 nm to 8.0 nm, and particularly preferably from 4.0 nm to 5.0 nm. When the average particle size of the alloy microparticles inside the mesopores is adjusted to 2.0 nm or more, the catalytic activity is further enhanced. This is because the proportion of the non-platinum metal in the alloy microparticles supported inside mesopores is increased, and the catalyst having a desired non-platinum metal content ratio is likely to be obtained. Furthermore, when the average particle size of the alloy microparticles inside the mesopores is 2.0 nm or more, the alloy microparticles are relatively firmly supported inside the mesopores, and contact between the alloy microparticles and the electrolyte inside the catalyst layer is more effectively suppressed or prevented. Furthermore, elution caused by potential change can be prevented, and deterioration of performance over time can also be suppressed. Therefore, the catalytic activity can be further enhanced. That is, the catalyst reaction can be promoted more efficiently. Furthermore, when the average particle size of the alloy microparticles inside the mesopores is 30 nm or less, the alloy microparticles can be supported inside the mesopores of the support by a convenient method, and the coverage of the alloy microparticles by the electrolyte can be reduced.

Regarding the "average particle size of the alloy microparticles inside the mesopores" according to the present invention, a value calculated as follows is employed: the catalytic metals exposed on the surface of catalyst particles and the catalytic metals inside the mesopores are specified using scanning electron microscopy (SEM) and transmission electron microscopy (TEM). Ten to fifty catalytic metal inside the mesopores are specified, and for each of the particles, the particle size (diameter) is obtained to the second decimal place. Then, the average value is calculated. At this time, the average value is determined to the second decimal place, and the average value is determined up to the first decimal place by rounding off the second decimal digit.

It is preferable that the catalyst has mesopores, and the mode radius (modal diameter) of pore distribution of the mesopores is 1 nm or more and less than 2.5 nm, and preferably from 1 nm to 2 nm. In the present specification, since pores having a radius of 1 nm or more are designated as mesopores, and the mode diameter of the mesopores is definitely 1 nm or more. Furthermore, since the mode radius of pore distribution of the mesopores of the catalyst is less than 2.5 nm, it is more difficult for the electrolyte (electrolytic polymer) to penetrate into the interior of the mesopores. Therefore, the catalytic activity is markedly enhanced.

Furthermore, the mode radius of pore distribution of the mesopores of the catalyst is preferably 0.6 or less, and more preferably 0.1 to 0.6, with respect to the average particle size of the alloy microparticles inside the mesopores. When such a relation is satisfied, the distance between the alloy microparticles and the inner wall surface of the pores of the support is reduced, and the space in which water can exist is further reduced. That is, the amount of water adsorbing to the alloy microparticle surface is further reduced. Furthermore, water is subjected to an interaction of the inner wall surface of the pores, and water can be easily retained on the inner wall surface of the pores. Therefore, the reaction for forming metal oxides is further delayed, and it becomes more difficult for metal oxides to be formed. As a result, deactivation of the alloy microparticle surface is further suppressed, and higher catalytic activity can be exhibited. That is, the catalytic reaction can be further accelerated. Furthermore, the catalytic metals are relatively firmly supported inside the pores (mesopores), and a contact between the catalytic metals and the electrolyte inside the catalyst layer is more effectively suppressed or prevented. In addition, elution caused by potential change is prevented, and deterioration of performance over time can also be suppressed. Therefore, the catalytic activity can be further enhanced. That is, the catalytic reaction can be accelerated more efficiently.

A pore volume of pores having a radius of 1 nm or more and less than 2.5 nm (mesopores) in a catalyst is not particularly limited; however, it is preferable that the pore volume is 0.4 cc/g of the support or more. When the pore volume is in such a range as described above, a larger quantity of catalytic metals can be stored (supported) by the mesopores, and the electrolyte and the catalytic metals can be physically separated within the catalyst layer (a contact between the catalytic metals and the electrolyte can be suppressed or prevented more effectively). Therefore, the activity of the catalytic metals can be utilized more effectively. Furthermore, due to the existence of numerous mesopores, the catalytic reaction can be accelerated more effectively. In the present specification, the pore volume of pores having a radius of 1 nm or more and less than 2.5 nm is also simply referred to as "pore volume of mesopores". The pore volume of the mesopores is more preferably 0.4 to 3 cc/g of the support, and particularly preferably 0.4 to 1.5 cc/g of the support.

The "pore radius (nm) of mesopores" means the radius of pores measured by a nitrogen adsorption method (DH method). Furthermore, the "mode radius (nm) of pore distribution of mesopores" means the pore radius at the point having the peak value (highest frequency) for a differential pore distribution curve obtainable by a nitrogen adsorption method (DH method). The pore radius (nm) of mesopores of a catalyst can be measured by applying the DH method.

The "pore volume of mesopores" means the total volume of mesopores having a radius of 1 nm or more and less than 2.5 nm existing in a catalyst, and the pore volume is expressed as the volume per gram of the support (cc/g of the support). The "pore volume of mesopores (cc/g of the support)" is calculated as the area of under a differential pore distribution curve (integrated value) determined according to the nitrogen adsorption method (DH method). The pore volume of a catalyst can be measured by applying the DH method.

The term "differential pore distribution" is a distribution curve obtained by plotting the pore diameter on the axis of abscissa and the pore volume corresponding to that pore diameter in a catalyst on the axis of ordinate. That is, when the pore volume of a catalyst obtainable by the nitrogen adsorption method (DH method) is designated as V, and the pore diameter is designated as D, the value obtainable by dividing the differential pore volume dV by the logarithmic derivative of the pore diameter, d(log D), (dV/d(log D)), is determined. Then, a differential pore distribution curve is obtained by plotting this dV/d(log D) against the average pore diameters of various sections. The differential pore volume dV refers to an increment of the pore volume between measurement points. In the present specification, the methods for measuring the radius and pore volume of the mesopores according to a nitrogen adsorption method (DH method) are not particularly limited, and for example, the methods described in known literatures such as "Kyuchaku no Kagaku (Science of Adsorption)" ($2^{nd}$ Edition, written by Seiichi Kondo, Tatsuo Ishikawa, and Ikuo Abe, Maruzen Publishing Co., Ltd.); "Nenryo Denchi no Kaiseki Shuho (Fuel Cell Characterization Methods)" (edited by Yoshio Takasu, Masaru Yoshitake, and Tatsumi Ishihara, Kagaku-Dojin Publishing Company, Inc); and D. Dollion and G. R. Heal: J. Appl. Chem., 14, 109 (1964), can be employed.

According to the present specification, the radius and pore volume of mesopores according to the nitrogen adsorption method (DH method) are values measured by the method described in D. Dollion and G. R. Heal: J. Appl. Chem., 14, 109 (1964).

The BET specific surface area of the electrode catalyst (BET specific surface area of the catalyst per gram of the support ($m^2/g$ of the support)) is not particularly limited; however, the BET specific surface area is preferably 600 $m^2/g$ of the support or more, more preferably 600 to 3,000 $m^2/g$ of the support, and even more preferably 1,100 to 1,800 $m^2/g$ of the support. With a specific surface area such as described above, a larger quantity of alloy particles can be stored (supported) in the mesopores. Furthermore, the electrolyte and the alloy particles are physically separated in the catalyst layer (a contact between the alloy particles and the electrolyte can be suppressed or prevented more effectively). Therefore, the activity of the alloy particles can be utilized more effectively.

According to the present specification, the "BET specific surface area ($m^2/g$ of the support)" of a catalyst (or catalyst support that will be described below) is measured by the nitrogen adsorption method. More particularly, about 0.04 to 0.07 g of a catalyst (support) powder is precisely weighed and encapsulated in a sample tube. This sample tube is preliminarily dried in a vacuum dryer at 90° C.×several hours, and thus a sample for measurement is obtained. For the weighing, an electronic balance (AW220) manufactured by SHIMADZU CORPORATION is used. In the case of a coated sheet, a net weight of about 0.03 to 0.04 g of the coating layer calculated by subtracting the weight of TEFLON (registered trademark) (base material) having the same area from the total weight of the coated sheet is used as the sample weight. Next, the BET specific surface area is measured under the following measurement conditions. A BET plot is produced over a relative pressure ($P/P_0$) range of about 0.00 to 0.45 on the adsorption side of an adsorption/desorption isotherm, and the BET specific surface area is calculated from the gradient and the intercept.

[Chem. 1]
<Measurement Conditions>
Measuring apparatus: Fully automated high-precision gas adsorption apparatus manufactured by BEL Japan, Inc., BELSORP36
Adsorption gas: $N_2$
Dead volume measurement gas: He
Adsorption temperature: 77 K (liquid nitrogen temperature)
Treatment before measurement: Vacuum drying at 90° C. for several hours (after He purge, set on a measurement stage)
Measurement mode: Isothermal adsorption process and desorption process
Relative measurement pressure $P/P_0$: About 0 to 0.99
Average set time: 180 sec for 1 relative pressure (Catalytic Metals and Alloy Microparticles)

Catalytic metals have a function of performing catalytic action in an electrochemical reaction.

The catalytic metals include platinum and a non-platinum metal. The non-platinum metal is not particularly limited; however, examples include ruthenium, iridium, rhodium, palladium, osmium, tungsten, lead, iron, copper, silver, chromium, cobalt, nickel, manganese, vanadium, molybdenum, gallium, aluminum, zinc, and zirconium. The non-platinum metal is not particularly limited; however, from the viewpoints of catalytic activity and the ease of forming an intermetallic compound or an $L1_2$ structure, which will be described below, it is preferable that the non-platinum metal is a transition metal. Here, the term of transition metal refers to elements ranging from an element of Group 3 to an element of Group 12, and the type of the transition metal is not particularly limited. From the viewpoints of the catalytic activity and the ease of forming an intermetallic compound or an $L1_2$ structure, it is preferable that the transition metal is selected from the group consisting of vanadium (V), chromium (Cr), manganese (Mn), iron (Fe), cobalt (Co), copper (Cu), zinc (Zn), and zirconium (Zr). Among them, it is preferable that the transition metal is cobalt (Co). As such, when metal atoms that form an intermetallic compound with platinum (Pt) among transition metals are included, the activity is increased. Since the above-mentioned transition metals can easily form intermetallic compounds with platinum (Pt), the mass specific activity (activity per unit mass) can be further increased, while the amount of use of platinum is reduced. Furthermore, alloys of the above-mentioned transition metals and platinum can achieve higher area specific activity (activity per unit area). Meanwhile, the transition metals may be alloyed singly with platinum, or two or more kinds thereof may be alloyed with platinum.

According to the present embodiment, alloy microparticles of platinum and a non-platinum metal are supported inside mesopores.

In general, an alloy is obtained by mixing a metal element with at least one metal element or non-metal element, and is a general term for substances having metallic properties. The structure of the alloy includes an eutectic alloy which is a mixture where component elements form separate crystals, an alloy where component elements are completely fused to form a solid solution, an alloy where component elements form a intermetallic compound or a compound between a metal and a non-metal.

From the viewpoint that the activity of the alloy can be further enhanced, it is preferable that the alloy microparticles in the electrode catalyst have an intermetallic compound structure in which platinum atoms and atoms of a metal other than platinum are arranged with regularity, as an internal structure. Whether the alloy microparticles have an intermetallic compound structure can be detected based on the presence of peaks characteristic to an intermetallic compound in an X-ray diffraction (XRD) pattern.

Furthermore, it is preferable that the alloy microparticles in the electrode catalyst have an $L1_2$ structure, and the extent of ordering of the $L1_2$ structure is 30% to 100%. Alloy microparticles having the above-described configuration can exhibit high activity, even if the alloy microparticles have a small platinum content. The extent of ordering of the $L1_2$ structure is preferably in the range of 40 to 100%, more preferably in the range of 45 to 100%, further more preferably in the range of 47 to 95%. Thereby, the activity of the electrode catalyst (especially an area specific activity) can be further improved.

The "extent of ordering (%) of the $L1_2$ structure" can be determined based on a method disclosed in J. Mater. Chem., 2004, 14, 1454-1460, and is defined as a ratio between a peak area (Ia) of maximum intensity and a peak area (Ib) specific to the intermetallic compound in an X-ray diffraction (XRD) pattern. Specifically, the "extent of ordering (%) of the $L1_2$ structure" is a value measured according to the following method.

<Method of Measuring Extent of Ordering of $L1_2$ Structure>

The catalyst particle(s) is subjected to X-ray diffraction (XRD) under the following conditions, to obtain an XRD pattern. In the resulting XRD pattern, a peak area (Ia) observed at a $2\theta$ value in the range of 39 to 41° and a peak area (Ib) observed at a $2\theta$ value in the range of 31 to 34° are measured. The peak observed at a $2\theta$ value in the range of 39 to 41° corresponds to a peak derived from a platinum part or (1 1 1) of an alloy part. In addition, a peak observed at a $2\theta$ value in the range of 31 to 34° corresponds to a specific peak for an $L1_2$ structure of the alloy microparticle.

[Chem. 2]
X(-ray diffraction conditions)
X-ray diffraction measurement apparatus: Smart-Lab manufactured by Rigaku Corporation (using a graphite monochrometer for a detector)
X-ray: CuKα-ray
Scanning rate: 3°/min.
Operating voltage: 45 kV
Operating current: 200 mA The extent of ordering of the $L1_2$ structure is calculated using the peak areas Ia and Ib by the following Formula (1).

[Mathematical Formula 1]

$$\text{Extent of ordering (\%)} = \left[\frac{(Ib/Ia)}{X}\right]^{0.5} \times 100 \qquad \text{Expression (1)}$$

In Formula (1), X is a specific value for a non-platinum metal constituting the alloy microparticle. Specifically, the X is a value indicated in the following table.

TABLE 1

| Non-platinum metal atoms | V | Cr | Mn | Fe | Co | Cu | Zn | Zr |
|---|---|---|---|---|---|---|---|---|
| X | 0.14 | 0.13 | 0.13 | 0.13 | 0.13 | 0.13 | 0.10 | 0.06 |

In the electrode catalyst of the present embodiment, alloy microparticles may exist in sites other than the mesopores. The composition of the alloy microparticles existing in the entirety of the electrode catalyst is not particularly limited. From the viewpoint of the catalytic activity or the like, the composition of the catalytic metal existing in the entirety of the electrode catalyst is such that the amount of platinum with respect to 1 mol of the non-platinum metal is preferably 1.0 to 15.0 mol, more preferably 1.0 to 10.0 mol, and particularly preferably 1.5 to 6.0 mol. When such a composition is used, high catalytic activity can be exhibited while the content of platinum is reduced, and cost reduction for fuel cells is made possible. The composition of the catalytic metals existing in the entirety of the electrode catalyst can be measured using an ICP-MS (inductively coupled plasma mass spectrometer).

The electrode catalyst may include other catalyst components such as platinum, ruthenium, iridium, rhodium, palladium, osmium, tungsten, lead, iron, copper, silver, chromium, cobalt, nickel, manganese, vanadium, molybdenum, gallium, and aluminum, together with the alloy microparticles.

There are no particular limitations on the shape or size of the alloy microparticles, and shapes and sizes similar to those of known catalyst components can be employed. Regarding the shape, for example, objects having a granular shape, a scaly shape, a layered shape or the like can be used; however, a preferred shape is a granular shape.

The loading concentration (may be referred to as loading amount or loading percentage) of the catalytic metals in the electrode catalyst is not particularly limited; however, it is preferable that the loading concentration is preferably set to 2% to 70% by weight with respect to the total amount of the support. When the loading concentration is adjusted to such a range, it is preferable because aggregation between catalyst particles is suppressed, and an increase in the thickness of the electrode catalyst layer can be suppressed. The loading concentration is more preferably 5% to 60% by weight, and even more preferably 10% to 60% by weight. Meanwhile, the loading amount of the catalytic metals can be investigated according to conventionally known methods such as inductively coupled plasma emission spectrometry (ICP atomic emission spectrometry), inductively coupled plasma mass spectrometry (ICP mass spectrometry), and fluorescence X-ray analysis (XRF).

(Catalyst Support)

A material of the catalyst support is not particularly limited as long as the material has mesopores, can form pores inside the support such that the mode diameter of the mesopores is 1 nm or more and less than 2.5 nm, has a sufficient specific surface area for supporting catalytic components inside the mesopores in a dispersed state, and has sufficient electron conductivity. Preferably, the catalyst support contains carbon as a main component. Suitably, it is preferable that as will be described below, a support produced using a method described in publications such as JP 2010-208887 A (US 2011/318254 A; hereinafter, the same) or WO 2009/075264 A (US 2011/058308 A; hereinafter, the same) is used as a starting raw material, and a product obtained by loading platinum and a non-platinum metal on this support is used as the electrode catalyst. In addition, other materials which contains carbon as main component includes concretely carbon black such as acetylene black, channel black, oil furnace black, gas furnace black (for example, Vulcan), lamp black, thermal black, and Ketjen black (registered trademark); black pearl (registered trademark); graphitized acetylene black; graphitized channel black; graphitized oil furnace black; graphitized gas furnace black; graphitized lamp black; graphitized thermal black; graphitized Ketjen black; graphitized black pearl; carbon nanotube; carbon nanofiber; carbon nanohorn; carbon fibril; activated carbon; coke; natural graphite; and synthetic graphite. The phrase "containing carbon as a main component" means that carbon atoms are included as a main component, and this involves a concept including both of being composed only of carbon atoms and of being substantially composed of carbon atoms. Thus, elements other than carbon may be included. The phrase "being substantially composed of carbon atoms" means that incorporation of impurities at a proportion of about 2% to 3% by weight or less is tolerable.

In addition to the carbon materials described above, porous metals such as Sn (tin) and Ti (titanium), electro-conductive metal oxides, and the like can also be used as the support.

It is preferable that the average particle size (diameter) of the support is 20 to 100 nm. When the average particle size is in such a range, the support can maintain its mechanical strength even in a case in which the above-described porous structure is provided, and the catalyst layer can be controlled to an appropriate extent. Regarding the value of the "average particle size of the support", unless particularly stated otherwise, a value calculated as the average value of the particle sizes of particles that are observed within several visual fields to several ten visual fields using an observation means such as a scanning electron microscope (SEM) or a transmission electron microscope (TEM), will be employed. Furthermore, the "particle size" is to mean the maximum distance among the distances between any arbitrary two points on the contour line of a particle.

[Method for Producing Electrode Catalyst]

The method for producing an electrode catalyst is not particularly limited; however, it is preferable that platinum particles are supported on a support, subsequently a non-platinum metal is supported on the platinum particles, and the metals are alloyed.

Furthermore, in order to efficiently form an alloy of the non-platinum metal with respect to the platinum particles inside mesopores, it is preferable to subject the support before being brought into contact with the non-platinum metal, to a hydrophilization treatment.

In the following description, a suitable method for producing an electrode will be explained. Meanwhile, the method for producing an electrode of the present invention is not intended to be limited to the method described below.

According to an embodiment, the method for producing an electrode catalyst includes: Step (1) of adding a reducing agent to a solution containing a support and a platinum precursor and producing a platinum particle-supported support; and Step (2) of mixing the platinum particle-supported support with a non-platinum metal precursor and subjecting the mixture to an alloying treatment, and the method further includes Step (A) of subjecting the support to a hydrophilization treatment. Furthermore, from the viewpoint of accelerating the alloying of the non-platinum metal inside the mesopores, it is important to carry out Step (A) after Step (1) and before Step (2). That is, a suitable embodiment of the method for producing an electrode catalyst is a method for producing an electrode catalyst, the method including: Step (1) of adding a reducing agent to a mixed liquid containing a support and a platinum precursor and producing a platinum particle-supported support; Step (A) of subjecting the platinum particle-supported support to a hydrophilization treatment; and Step (2) of mixing the hydrophilization-treated platinum particle-supported support with a non-platinum metal precursor and subjecting the mixture to an alloying treatment, in this order.

The electrode catalyst of the present embodiment is such that a particular amount of a non-platinum metal is included in the alloy particles inside the mesopores. As described in WO 2014/060646 A, in regard to an electrode catalyst having mesopores with a small mode diameter, the present inventors found that when platinum is supported on a support and then a non-platinum metal is supported thereon, the catalytic metal particles inside the mesopores are mostly formed from platinum metal. Here, the inventors paid attention to the question of why alloying of the catalytic metal particles in the mesopores would not proceed in conventional cases, and the inventors suspected that it could be difficult for the solution containing a non-platinum metal to penetrate into the mesopores, as compared to the solution containing platinum metal. Therefore, the inventors considered that measures for making it easier for the solution containing a non-platinum metal to penetrate into the mesopores are necessary. Thus, the inventors found that when a hydrophilization treatment of the platinum-supported support and optionally a degassing treatment are carried out, it becomes easy for the non-platinum metal precursor to penetrate into the mesopores, and alloying of platinum particles and a non-platinum metal proceeds.

Furthermore, when platinum particles are supported on a support, and then the support is brought into contact with a non-platinum metal to alloy the metals, alloying of the platinum particles and the non-platinum metal inside the mesopores is carried out reliably. Therefore, it is considered that alloy particles having the composition ratio described above can be produced inside the mesopores.

In the following description, the respective steps will be explained.

Step (1)

Step (1) is a step of adding a reducing agent to a mixed liquid containing a support and a platinum precursor and producing a platinum particle-supported support.

First, a support is prepared. On the occasion that an electrode catalyst having particular pore distribution such as described above is produced, usually, it is important to regulate the mesopore distribution of the support into pore distribution such as described above. Therefore, regarding the support to be used, it is preferable to use a support having mesopores with a radius of 1 nm or more, in which the mode diameter of the mesopores is 1 nm or more and less than 2.5 nm. A support having mesopores is referred to as "porous support" in the present specification. Such a support can be produced by referring to the methods described in, specifically, JP 2010-208887 A (US 2011/318254 A1; hereinafter, the same) or WO 2009/075264 A (US 2011/058308 A; hereinafter, the same). As a result, a support having pores with particular pore distribution (having mesopores with a radius of 1 nm or more, in which the mode diameter of the mesopores is 1 nm or more and less than 2.5 nm) can be formed.

The BET specific surface area of the support used is preferably 600 to 3,000 m$^2$/g, and more preferably 1,000 to 1,800 m$^2$/g. With a specific surface area such as described above, sufficient mesopores can be secured, and therefore, a larger quantity of alloy particles can be stored (supported) in the mesopores. Furthermore, the electrolyte and the alloy particles can be physically separated in the catalyst layer, and thus a contact between the alloy particle and the electrolyte can be more effectively suppressed or prevented. Therefore, the activity of the alloy particles can be utilized more effectively. Furthermore, a balance between the dispersibility of the catalyst component on the catalyst support and the effective utilization ratio of the catalyst component can be appropriately controlled.

The mode radius (modal diameter) of pore distribution of mesopores in the support used is 1 nm or more and less than 2.5 nm, and the mode radius is preferably from 1 nm to 2 nm. The pore volume of pores having a radius of 1 nm or more and less than 2.5 nm (mesopores) in the support used is not particularly limited; however, the pore volume is preferably 0.6 cc/g of the support or more, more preferably 0.6 to 3 cc/g of the support, even more preferably 0.6 to 1.5 cc/g of the support, and particularly preferably 0.6 to 0.8 cc/g of the support.

Furthermore, it is acceptable to use a product obtained by subjecting a support having particular pores as described above to a further heat treatment, as the support. When such a heat treatment is carried out, amorphous portions of the support before the heat treatment are eliminated, and accordingly, the mode diameter of the mesopores of the support becomes large. Thus, introduction of a non-platinum metal precursor liquid into the mesopores is likely to be promoted, and alloying of the platinum particles and the non-platinum metal is accelerated, which is preferable.

Specifically, the heat treatment temperature for the support in the heat treatment described above is preferably higher than 1, 300° C. and 1,880° C. or lower, more preferably 1,380° C. to 1,880° C., and even more preferably 1,400° C. to 1,860° C. The rate of temperature increase in the heat treatment is preferably 100° C. to 1,000° C./hour, and particularly preferably 300° C. to 800° C./hour. The heat treatment time (retention time at a predetermined heat treatment temperature) is preferably 1 to 10 minutes, and particularly preferably 2 to 8 minutes. Meanwhile, the heat treatment can be carried out in an inert gas atmosphere such as argon gas or nitrogen gas.

The platinum precursor is not particularly limited, but platinum salts and platinum complexes can be used. More specifically, examples of the platinum precursor which can be used include chloroplatinic acid (typically, chloroplatinic acid hexahydrate; $H_2[PtCl_6] \cdot 6H_2O$), nitrate such as dinitrodiammine platinum, sulphates, ammonium salst, amines, ammine salts such as tetraammine platinum and hexaammine platinum, carbonates, bicarbonates, halides such as platinum chloride, nitrites, inorganic salts such as oxalate, carboxylates such as formate, and hydroxides, alkoxides. The platinum precursor may be used alone or in combination of two or more thereof.

A solvent used in the preparation of the mixed liquid containing the support and the platinum precursor is not particularly limited, and is appropriately selected depending on the kind of the platinum precursor to be used. A form of the mixed liquid is not particularly limited, and includes a solution, a dispersion, and a suspension. Specifically, examples of the solvent include water, an organic solvent such as methanol, ethanol, 1-propanol, 2-propanol, an acid, and an alkaline. Among them, from the viewpoint of sufficiently dissolving an ion compound of the platinum/non-platinum metal, water is preferably used, and pure water or ultrapure water is particularly preferably used. The solvent may be used alone or in combination of two or more thereof.

The weight content ratio of the support and the platinum precursor in the mixed liquid is set as appropriate in consideration of the platinum loading amount; however, it is preferable to adjust the ratio to support:platinum=1:0.02 to 2.3.

The method for producing the mixed liquid containing a support and a platinum precursor is not particularly limited. For example, any of a method of dissolving a platinum precursor in a solvent and then adding a support to this solution; a method of adding a support to a solvent and then adding a platinum precursor thereto; a method of adding a support and a platinum precursor to a solvent; and a method of separately adding a platinum precursor and a support to a solvent and then mixing these mixtures, may be used. Since a platinum precursor can uniformly cover the support, it is preferable that the platinum precursor is dissolved in a solvent, and then the support is added to this solution. The platinum concentration to be reached when the platinum precursor is dissolved in a solvent is not particularly limited; however, the platinum concentration in the solution after dissolution is preferably 0.1% to 50% by weight, and more preferably 0.5 to 20% by weight.

Furthermore, the mixed liquid is preferably stirred so as to be uniformly mixed. Stirring conditions are not particularly limited as long as the uniform mixing can be achieved. For example, the mixed liquid can be uniformly dispersed and mixed by using a suitable stirring machine such as a stirrer and a homogenizer, or an ultrasonic dispersing apparatus which is configured to apply ultrasonic waves. Furthermore, a stirring temperature is preferably in the range of 0 to 50° C., and more preferably in the range of 5 to 40° C. In addition, a stirring time may be appropriately set to perform sufficient dispersion.

Examples of the reducing agent include ethanol, methanol, propanol, formic acid, formate such as sodium formate and potassium formate, formaldehyde, sodium thiosulfate, citric acid, citrate such as sodium citrate and trisodium citrate, sodium borohydride ($NaBH_4$), and hydrazine ($N_2H_4$). The reducing agents may be in the form of hydrate. In addition, the reducing agents may be used in combination of two or more kinds thereof. Furthermore, the reducing agent may be added as reducing agent liquid.

An amount of the reducing agent to be added is not particularly limited as long as the amount is sufficient to reduce platinum ions. Specifically, the amount of the reducing agent to be added is preferably in the range of 1 to 200 moles, and more preferably in the range of 1.5 to 100 moles, with respect to 1 mole of the platinum ions (total moles of platinum ions and non-platinum metal ions (in terms of metal)). With such an amount, the metal ions (platinum ions and non-platinum ions) are sufficiently reduced at the same time. When two or more kinds of reducing agent are used, the amount of the reducing agents to be added is preferably within the above range in total.

Stirring is preferably performed after a reducing agent is added. By this, since the platinum precursor and the reducing agent are uniformly mixed with each other, a uniform reduction reaction can occur. Here, stirring conditions are not particularly limited as long as the uniform mixing can be achieved. For example, the mixed liquid can be uniformly dispersed and mixed by using a suitable stirring machine such as a stirrer and a homogenizer, or an ultrasonic dispersing apparatus which is configured to apply ultrasonic waves. A stirring temperature is preferably in the range of 0° C. to boiling point of the liquid. In addition, a stirring time is not particularly limited as long as the platinum precursor and the reducing agent can be uniformly mixed with each other.

A platinum particle-supported support is obtained by the reduction reaction described above.

The particle size of the platinum particles inside the mesopores may be increased by performing a heat treatment after platinum particles are deposited by the reduction reaction. As the particle size of the platinum particles is larger, alloying of the non-platinum metal with the platinum particles existing inside the mesopores is accelerated, and the percentage content of the non-platinum metal in the alloy microparticles inside the mesopores can be increased. Therefore, the above-described heat treatment may be carried out, for the purpose of controlling the percentage content of the non-platinum metal in the alloy microparticles inside the mesopores.

The heat treatment conditions are not particularly limited as long as they are conditions by which the particle size of the platinum particles can be increased. For example, the heat treatment temperature is preferably 500° C. to 1,200° C., and more preferably 700° C. to 1,100° C. Furthermore, the heat treatment time is preferably 0.1 to 3 hours, and more preferably 0.1 to 1.5 hours. Meanwhile, the heat treatment process may be carried out in a hydrogen atmosphere.

In addition, the platinum particle-supported support may be isolated from the solution, if necessary. An isolation method is not particularly limited, and the platinum particle-supported support can be isolated by filtration and drying. If necessary, after the filtration of the platinum particle-supported support, cleaning (for example, washing with water) may be performed. In addition, the filtration and the cleaning as necessary may be repeated. Furthermore, after the filtration or the cleaning, the platinum particle-supported support may be dried. The platinum particle-supported support may be dried in air or under a reduced pressure. A drying temperature is not particularly limited, but is, for example, in the range of 10 to 100° C., preferably in the approximate range from a room temperature (25° C.) to 80° C. A drying time is not particularly limited, but is, for example, in the range of 1 to 60 hours, preferably in the range of about 5 to 50 hours.

In regard to Step (1), the platinum loading amount on the support can be controlled by appropriately setting the platinum concentration in the mixed liquid, the time for immersion of the support, the reduction conditions, and the like.

The loading concentration (may be referred to as loading amount or loading ratio) of the platinum particle-supported support thus obtained is not particularly limited; however, from the viewpoint of the catalytic activity, it is preferable that the loading concentration is adjusted to 10% to 60% by weight with respect to the total amount of the support.

Step (A)

Step (A) is a step of subjecting the support to a hydrophilization treatment. Through such a hydrophilization treatment, introduction of the non-platinum metal precursor into the mesopores is accelerated, and the catalyst particles inside the mesopores can form uniformly alloyed alloying particles. Thus, the catalytic activity can be enhanced.

Regarding the hydrophilization treatment for the support, a method of introducing a hydrophilic group into the support, as described in JP 2012-124001 A (US 2013/244137 A), may be employed. The hydrophilic group is preferably at least one selected from the group consisting of a hydroxyl group, a lactone group, and a carboxyl group.

The amount of introduction (bonding amount) of the hydrophilic group is appropriately set such that the alloy composition inside the mesopores is adjusted to an appropriate range; however, the amount of introduction is preferably 0.01 to 5.0 mmol/g, and more preferably 0.1 to 3.0 mmol/g. Meanwhile, quantitative determination of the hydrophilic group is achieved using a titration method, and specifically, the quantitative determination is based on the method described in paragraph "0025" of JP 2012-124001 A, the details of which are as follows.

The amount of the hydrophilic group is measured by a titration method as described below. That is, first, 2.5 g of a sample is washed with 1 L of warm pure water and is dried. After drying, the sample is weighed such that the amount of the support included in the sample will be 0.25 g, the sample was stirred with 55 ml of water for 10 minutes, and then the mixture is subjected to ultrasonic dispersion for 2 minutes. Next, this dispersion liquid is transferred into a glove box that has been purged with nitrogen gas, and the dispersion liquid is bubbled with nitrogen gas for 10 minutes. Then, an excess amount of 0.1 M basic aqueous solution is introduced into the dispersion liquid, and this basic solution is subjected to neutralization titration with 0.1 M hydrochloric acid. Thus, the amount of hydrophilic groups is quantitatively determined from the point of neutralization. Here, for the basic aqueous solution, three types of NaOH, $Na_2CO_3$, and $NaHCO_3$ are used, and the neutralization titration operation is carried out for each of them. This is because different bases should be used for different types of the hydrophilic group to be neutralized. It is because NaOH undergoes a neutralization reaction with a carboxyl group, a lactone group, or a hydroxyl group; $Na_2CO_3$ undergoes a neutralization reaction with a carboxyl group or a lactone group; and NaHCO$_3$ undergoes a neutralization reaction with a carboxyl group. Then, the amount of the hydrophilic group is calculated based on the results of the type and amount of the three types of these bases introduced for the titration, and the amount of hydrochloric acid thus consumed. The point of neutralization is checked using a pH meter. In the case of NaOH, pH 7.0 is designated as the point of neutralization; in the case of Na$_2$CO$_3$, pH 8.5 is designated as the point of neutralization; and in the case of NaHCO$_3$, pH 4.5 is designated as the point of neutralization. Thereby, the total amount of carboxyl groups, lactone groups, and hydroxyl groups is determined.

The introduction of hydrophilic groups can be carried out by bringing the support into contact with an oxidizing solution. Examples of the oxidizing solution include solutions of sulfuric acid, nitric acid, phosphorous acid, potassium permanganate, hydrogen peroxide, hydrochloric acid, chloric acid, hypochlorous acid, and chromic acid. Among them, it is preferable to use at least one of sulfuric acid and nitric acid, from the viewpoint that it is easy to introduce a hydrophilic group. This oxidizing solution treatment may be carried out by bringing the support into contact with the oxidizing solution once, or may be carried out repeatedly for several times. Furthermore, in the case of performing the acid treatment several times, the type of the solution may be varied for each treatment.

The concentration of the oxidizing solution is preferably adjusted to 0.1 to 10.0 mol/L, and it is preferable that the support is mixed (immersed) into the solution. It is preferable that the mixed support dispersion liquid is stirred in order to achieve uniform mixing. Here, the stirring conditions are not particularly limited as long as conditions in which uniform mixing in particular can be achieved are employed. For example, uniform dispersing and mixing can be achieved by using an appropriate stirring machine such as a stirrer or a homogenizer, or by applying ultrasonic waves using an ultrasonic dispersing apparatus or the like. Furthermore, the stirring temperature is preferably 0° C. to 50° C., and more preferably 5° C. to 40° C. Furthermore, the stirring time may be appropriately set such that dispersion is sufficiently achieved.

Next, it is preferable to heat the dispersion liquid, and the introduction of a hydrophilic group is accelerated by heating. Here, the heating conditions are not particularly limited as long as conditions in which a hydrophilic group can be introduced into the support are employed. For example, the heating temperature is preferably 50° C. to 100° C., and more preferably 60° C. to 95° C. The heating time is preferably 0.5 hours to 3 hours.

Here, the platinum particle-supported support after the hydrophilization treatment may be isolated from the dispersion liquid, if necessary. An isolation method is not particularly limited, and the platinum particle-supported support can be isolated by filtration and drying. If necessary, after the filtration of the platinum particle-supported support, cleaning (for example, washing with water) may be performed. In addition, the filtration and the cleaning as necessary may be repeated. Furthermore, after the filtration or the cleaning, the platinum particle-supported support may be dried. The platinum particle-supported support may be dried in air or under a reduced pressure. A drying temperature is not particularly limited, but is, for example, in the range of 10 to 100° C., preferably in the approximate range from a room temperature (25° C.) to 80° C. A drying time is not particularly limited, but is, for example, in the range of 1 to 60 hours, preferably in the range of about 5 to 50 hours.

Furthermore, the dispersion liquid of the platinum-supported support after the hydrophilization treatment may be directly used in Step (2). In this case, it is preferable that an alkali such as sodium hydroxide is added to the dispersion liquid, and pH adjustment (preferably, the pH is adjusted to 1 to 5) is carried out.

Step (2)

Step (2) is a step of mixing the hydrophilization treated platinum particle-supported support with a non-platinum metal precursor and subjecting the mixture to an alloying treatment.

Regarding the non-platinum metal precursor, a non-platinum metal salt and a non-platinum metal complex can be used. More specifically, inorganic salts such as nitrates, sulfates, ammonium salts, amines, carbonates, bicarbonates, halides such as bromides and chlorides, nitrites, and oxalates; carboxylic acid salts such as formates; hydroxides, alkoxides, and oxides of non-platinum metals can be used. That is, compounds from which non-platinum metals can be converted to metal ions in a solvent such as pure water may be preferably used. Among these, regarding the salts of non-platinum metals, halides (particularly chlorides), sulfates, and nitrates are more preferred. Specific examples of a non-platinum metal precursor include ruthenium chloride, ruthenium nitrate, sodium ruthenate, potassium ruthenate, iridium chloride, iridium nitrate, hexaammine iridium hydroxide, iridium chloride, ammonium chloroiridate, potassium chloroiridate, rhodium chloride, rhodium nitrate, palladium chloride, palladium nitrate, dinitrodiamminepalladium, iron chloride, cobalt sulfate, cobalt chloride, and cobalt hydroxide. Meanwhile, the non-platinum metal precursors described above may be used singly or may be used as mixtures of two or more kinds thereof. Furthermore, the non-platinum metal precursor may in the form of hydrate.

The non-platinum metal precursor may be mixed with the platinum particle-supported support as a non-platinum metal precursor liquid. Examples of the solvent used for the non-platinum metal precursor liquid are similar to the solvents mentioned in the section for Step (1). The non-platinum metal concentration of the non-platinum metal precursor liquid is preferably 0.1% to 50% by weight, and more preferably 0.5% to 20% by weight.

The platinum particle-supported support is mixed (immersed) into the non-platinum metal precursor, and thereby a support supporting platinum and a non-platinum metal can be produced.

Here, the method for mixing the hydrophilization-treated platinum particle-supported support with the non-platinum metal precursor is not particularly limited. For example, any of a method of mixing (immersing) the platinum particle-supported support into a non-platinum metal precursor liquid; and a method of mixing a solvent dispersion liquid of the hydrophilization-treated platinum particle-supported support with the non-platinum metal precursor (or a non-platinum metal precursor liquid) may be used.

The weight mixing ratio of the hydrophilization-treated platinum particle-supported support and the non-platinum metal precursor is appropriately set in consideration of the loading amount of the non-platinum metal; however, it is preferable that the ratio platinum particle-supported support: non-platinum metal=1:0.05 to 2.

After the mixing of the hydrophilization-treated platinum particle-supported support and a non-platinum metal precursor liquid, it is preferable that the mixture is stirred in order to mix the mixture uniformly and to support the non-platinum metal uniformly. Here, the stirring conditions are not particularly limited as long as conditions in which the mixture can be mixed particularly uniformly are employed. For example, the mixture can be uniformly dispersed and mixed by using an appropriate stirring machine such as a stirrer or a homogenizer, or by applying ultrasonic waves with an ultrasonic dispersing apparatus or the like. Furthermore, the stirring temperature is preferably 0° C. to 50° C., and more preferably 5° C. to 40° C. Furthermore, the stirring time may be set as appropriate so that dispersion is sufficiently achieved.

Furthermore, in order to ensure the attachment of the non-platinum metal precursor to the platinum particle-supported support, a reducing agent may be added to the mixed liquid of the hydrophilization-treated platinum particle-supported support and the non-platinum metal precursor, or to a non-platinum precursor liquid. Regarding the reducing agent, for example, ethanol, methanol, propanol, formic acid, formic acid salts such as sodium formate and potassium formate, formaldehyde, sodium thiosulfate, citric acid, citric acid salts such as sodium citrate and trisodium citrate, sodium borohydride ($NaBH_4$), and hydrazine ($N_2H_4$) can be used. These may be in the form of hydrate. Furthermore, two or more kinds thereof may be used as mixtures. The reducing agent may be added in the form of a reducing agent solution.

The amount of addition of the reducing agent is not particularly limited as long as the amount is an amount sufficient for reducing a non-platinum metal precursor. Specifically, the amount of addition of the reducing agent is preferably 1 to 20 mol, and more preferably 1.5 to 10 mol, with respect to 1 mol of the non-platinum metal precursor. With such an amount, the non-platinum metal precursor can be sufficiently reduced. In the case of using two or more kinds of reducing agents, it is preferable that the amount of addition of the sum of these agents is in the range described above.

In regard to Step (2), the amount of loading of the non-platinum metal on the support can be controlled by setting the non-platinum metal concentration in the non-platinum metal precursor liquid, the immersion time for the non-platinum metal precursor, and the like as appropriate.

Through the treatment described above, a platinum-supported and non-platinum metal-supported support can be obtained.

Here, if necessary, the platinum-supported and non-platinum metal-supported support may be isolated from the dispersion liquid. Here, the isolation method is not particularly limited, and the platinum-supported and non-platinum metal-supported support may be filtered and dried. In addition, if necessary, after the platinum-supported and non-platinum metal-supported support is filtered, the support may be washed (for example, washed with water). The filtering and the optional washing processes may be carried out repeatedly. Furthermore, after filtering and washing, the platinum-supported and non-platinum metal-supported support may be dried. Here, the drying of the platinum-supported and non-platinum metal-supported support may be carried out in air or may be carried out under reduced pressure. Furthermore, the drying temperature is not particularly limited; however, for example, the drying can be carried out in a temperature range of 10° C. to 100° C., and preferably room temperature (25° C.) to about 80° C. The drying time is also not particularly limited; however, for example, the drying can be carried out in a duration range of 1 to 60 hours, and preferably about 5 to 50 hours.

Next, an alloying treatment is carried out.

The specific method for the alloying treatment is not particularly limited, and any known technique can be employed as appropriate. For example, a method of performing a heat treatment may be mentioned. The heat treatment conditions are not particularly limited as long as conditions in which alloying proceeds are employed. However, for example, the heat treatment temperature is preferably 600° C. to 1,200° C., and more preferably 800° C. to 1,200° C. Furthermore, the heat treatment time is preferably 0.5° to 10 hours, and more preferably 1 to 4 hours. In addition, a heat-treatment atmosphere is not particularly limited, but the heat-treatment is preferably performed in a non-oxidizing atmosphere so as to suppress and prevent oxidation of the alloy (platinum and non-platinum metal). An example of the non-oxidizing atmosphere includes an inert gas atmosphere or a reducing gas atmosphere. An inert gas is not particularly limited, but for example, helium (He), neon (Ne), argon (Ar), krypton (Kr), xenon (Xe), and nitrogen ($N_2$) can be used. The inert gas may be used alone or in the mixed gas form of two or more kinds. In addition, the reducing gas atmosphere is not particularly limited as long as a reducing gas is included, but is more preferably a mixed gas atmosphere of a reducing gas and an inert gas. The reducing gas is not particularly limited, but is preferably a hydrogen ($H_2$) gas, and a carbon monoxide (CO) gas.

After the alloying treatment, a heat treatment may be further carried out. Due to this heat treatment, the extent of ordering of the $L1_2$ structure of alloy particles in the catalyst can be increased to 30% to 100%. The extent of ordering of the $L1_2$ structure can be controlled by selecting the heat treatment conditions.

The heat treatment conditions are not particularly limited as long as conditions in which the extent of ordering can be increased up to 30% to 100% are employed. However, it is important to control the temperature and time for the heat treatment.

Specifically, when the heat treatment temperature is 350° C. to 450° C., it is preferable that the heat treatment is carried out for a time of preferably longer than 120 minutes, and more preferably 240 minutes or longer.

The upper limit of the heat treatment time at the above-mentioned heat treatment temperature is not particularly limited as long as the temperature is a temperature at which the catalyst particles can maintain a state of being supported on the support, and the heat treatment time is selected as appropriate depending on the particle size or type of the catalyst particles. For example, the heat treatment time is usually 36 hours or less, preferably 24 hours or less, more preferably 10 hours or less, and still more preferably 5 hours or less.

The heat treatment atmosphere in a case in which the heat treatment temperature is 350° C. to 450° C. is not particularly limited; however, it is preferable that the heat treatment is carried out in a non-oxidizing atmosphere in order to suppress and prevent oxidation of the alloy (platinum and a non-platinum metal). Here, since the non-oxidizing atmosphere has the same definition as described in the section for the alloying treatment, further explanation will not be repeated here. Furthermore, the reducing gas atmosphere is not particularly limited as long as a reducing gas is included in the atmosphere; however, a mixed gas atmosphere of a reducing gas and an inert gas is more preferred. In addition, a concentration of the reducing gas contained in the inert gas is also not particularly limited, but the content of the reducing gas in the inert gas is preferably in the range of 10 to 100 vol %, and more preferably in the range of 50 to 100 vol %. With such a concentration, the oxidation of the alloy (platinum and non-platinum metal) can be sufficiently suppressed and prevented. Of the above, the heat-treatment is preferably performed in the reducing gas atmosphere. With these conditions, it is possible to more effectively control the extent of ordering of the resulting a catalyst particle (alloy particle) in the range of 30 to 100% while suppressing the increase in the diameter of the catalyst particle.

When the heat-treatment temperature exceeds 450° C. but is 750° C. or lower, the heat-treatment is preferably performed for a period of 10 minutes or more, and more preferably 20 minutes or more. The upper limit of the heat-treatment time at the heat-treatment temperature is not particularly limited as long as the catalyst particle can be continued to be supported on the support, but is appropriately selected depending on the diameter or type of the catalyst particle. For example, the heat-treatment time is typically 36 hours or less, preferably 24 hours or less, more preferably 10 hours or less, and further more preferably 5 hours or less.

A heat-treatment atmosphere is not particularly limited when the heat-treatment temperature exceeds 450° C. but is 750° C. or lower, but the heat-treatment is preferably performed in a non-oxidizing atmosphere so as to suppress and prevent oxidation of the alloy (platinum and non-platinum metal). Here, since the non-oxidizing atmosphere is the same definition as described in the section for the alloying treatment, the description thereof will be omitted. Of the above, the heat-treatment is preferably performed in an inert gas atmosphere or a reducing gas atmosphere. With the above conditions, it is possible to more effectively control the extent of ordering of the resulting a catalyst particle (alloy particle) in the range of 30 to 100% while suppressing the increase in the diameter of the catalyst particle.

When the heat-treatment temperature exceeds 750° C., the heat-treatment is preferably performed for 10 to 45 minutes, and more preferably 20 to 40 minutes in a reducing gas atmosphere. Alternatively, when the heat-treatment temperature exceeds 750° C., the heat-treatment is preferably performed for 10 to 120 minutes, more preferably 30 to 100 minutes, and particularly preferably a period exceeding 45 minutes and of no more than 90 minutes in an inert gas atmosphere.

The upper limit of the heat-treatment temperature is not particularly limited as long as the catalyst particle can be continued to be supported on the support, but is appropriately selected depending on the diameter or type of the catalyst particle. Although the extent of ordering increases in proportion to the temperature and the time during the heat-treatment, the particle diameter tends to be increased by sintering. In consideration of the above point, for example, the heat-treatment temperature may be 1000° C. or lower. With such conditions, it is also possible to suppress agglomeration of the resulting a catalyst particle (alloy particle) on the support while suppressing the increase in the diameter of the catalyst particle. As used herein, since the "inert gas atmosphere" and the "reducing gas atmosphere" are the same definition as described in the section for the alloying treatment, the description thereof will be omitted. With the above conditions, it is possible to more effectively control the extent of ordering of the resulting a catalyst particle (alloy particle) in the range of 30 to 100% while suppressing the increase in the diameter of the catalyst particle.

In a preferred embodiment of the present invention, the heat-treatment after the alloying treatment is performed (a) at a temperature in the range of 350 to 450° C. for a time exceeding 120 minutes under a reducing gas atmosphere or an inert gas atmosphere; (b) at a temperature exceeding 450° C. but 750° C. or lower for 10 minutes or more under a reducing gas atmosphere or an inert gas atmosphere; (c) at a temperature exceeding 750° C. for a time of 10 to 120 minutes under an inert gas atmosphere; or (d) at a temperature exceeding 750° C. for a time of 10 to 45 minutes under a reducing gas atmosphere.

[Fuel Cell]

Another embodiment of the present invention relates to a membrane electrode assembly and a fuel cell, both including the electrode catalyst of the first embodiment. The electrode catalyst of the electrode catalyst of the first embodiment can exhibit high activity (area specific activity (activity per unit area) and mass specific activity (activity per unit mass)) even with a small platinum content. Therefore, a membrane electrode assembly or a fuel cell using the electrode catalyst of the first embodiment in the catalyst layer exhibits excellent power generation performance.

A fuel cell has a membrane electrode assembly (MEA); and a pair of separators composed of an anode-side separator having a fuel gas flow channel through which a fuel gas flows, and a cathode-side separator having an oxidizing agent gas flow channel through which an oxidizing gas flows. The fuel cell of the present embodiment has excellent durability and can exhibit high power generation performance.

Figure 2:
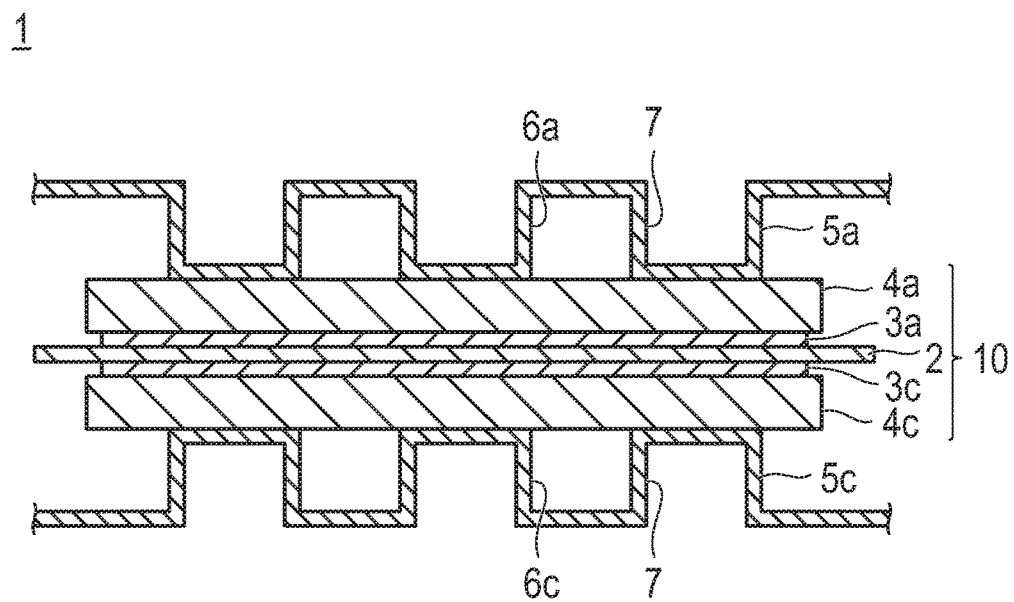
FIG. 2 is a cross-sectional view schematically illustrating a basic configuration of a polymer electrolyte fuel cell according to an embodiment of the present invention.

FIG. 2 is a schematic diagram illustrating the basic configuration of a solid-state polymer fuel cell (PEFC) 1 according to an embodiment of the present invention. First, PEFC 1 has a solid-state polymer electrolyte membrane 2, and a pair of catalyst layers (anode catalyst layer 3a and cathode catalyst layer 3c) having this electrolyte membrane sandwiched therebetween. The laminate of the solid-state polymer electrolyte membrane 2 and the catalyst layers (3a and 3c) is further sandwiched between a pair of gas diffusion layers (GDL) (anode gas diffusion layer 4a and cathode gas diffusion layer 4c). As such, the solid-state polymer type electrolyte membrane 2, a pair of catalyst layers (3a and 3c), and a pair of gas diffusion layers (4a and 4c) constitute a membrane electrode assembly (MEA) 10 in a laminated state.

In regard to PEFC 1, MEA 10 is further sandwiched between a pair of separators (anode separator 5a and cathode separator 5c). FIG. 2 is illustrated such that the separators (5a and 5c) are located at both ends of the MEA 10 illustrated in the diagram. However, in a fuel cell stack formed by a plurality of MEA's laminated together, generally, a separator is used also as a separator for an adjacent PEFC (not illustrated in the diagram). In other words, in a fuel cell stack, MEA's constitute a stack by being sequentially laminated, with separators being interposed therebetween. In an actual fuel cell stack, a gas seal is disposed between a separator (5a or 5c) and the solid-state polymer electrolyte membrane 2, or between a PEFC 1 and another PEFC adjacent thereto; however, in FIG. 2, description of these will not be provided.

The separator (5a or 5c) is obtained by, for example, subjecting a thin plate having a thickness of 0.5 mm or less to a pressing treatment and thereby molding the thin plate into a concavo-convex shape as illustrated in FIG. 2. Convexities as viewed from the MEA side of the separator (5a or 5c) are in contact with the MEA 10. Thereby, an electrical connection with the MEA 10 is secured. Furthermore, concavities (spaces between the separator and the MEA produced due to the concavo-convex shape of the separator) as viewed from the MEA side of the separator (5a or 5c) function as gas flow channels for circulating a gas at the time of operating the PEFC 1. Specifically, a fuel gas (for example, hydrogen) is circulated in a gas flow channel 6a of the anode separator 5a, and an oxidizing gas (for example, air) is circulated in a gas flow channel 6c of the cathode separator 5c.

Meanwhile, the concavities as viewed from the opposite side of the MEA side of the separator (5a or 5c) are regarded as coolant flow channels 7 for circulating a coolant (for example, water) for cooling the PEFC at the time of operating the PEFC 1. Furthermore, a separator is usually provided with a manifold (not illustrated in the diagram). This manifold functions as a connection means for connecting various cells when a stack is constructed. By adopting such a configuration, the mechanical strength of the fuel cell stack can be secured.

In the embodiment illustrated in FIG. 2, the separators (5a and 5c) are formed into a concavo-convex shape. However, the separators are not limited only to such concavo-convex shape, and the separators may also be in any arbitrary form such as a flat plate shape or a partially concavo-convex shape, as long as the separators can exhibit the functions as gas flow channels and coolant flow channels.

A fuel cell having the MEA of the present embodiment as described above exhibits excellent power generation performance and durability. Here, the type of the fuel cell is not particularly limited, and in the explanation given above, a polymer electrolyte type fuel cell has been explained as an example. However, in addition to these, examples of the fuel cell include an alkali type fuel cell, a direct methanol type fuel cell, and a micro fuel cell. Among them, a preferred example may be a polymer electrolyte type fuel cell (PEFC) that is small-sized and is capable of having high density and high power output. Furthermore, the fuel cell is useful as a stationary power supply or the like, in addition to a power supply for a mobile body such as a vehicle with a limited mounting space. Above all, it is particularly preferable that the fuel cell is used as a power supply for mobile body such as a vehicle where a high output voltage is required after stoppage of driving for a relatively long time.

The fuel used when the fuel cell is driven is not particularly limited. For example, hydrogen, methanol, ethanol, 1-propanol, 2-propanol, 1-butanol, secondary butanol, tertiary butanol, dimethyl ether, diethyl ether, ethylene glycol, and diethylene glycol can be used. Among them, hydrogen or methanol is preferably used from the viewpoint of being capable of obtaining high output power.

Furthermore, the application usage of the fuel cell is not particularly limited; however, it is preferable that the fuel cell is applied to vehicles. The electrolyte membrane-electrode assembly of the present invention has excellent power generation performance and durability, and size reduction can be realized. Therefore, the fuel cell of the present invention is particularly advantageous when the fuel cell is applied to a vehicle, from the viewpoint of onboard mountability. Therefore, the present invention provides a vehicle equipped with the fuel cell of the present invention.

In the following description, members constituting the fuel cell of the present embodiment will be briefly explained; however, the technical scope is not intended to be limited only to the following embodiments.

[Electrolyte Membrane-Electrode Assembly (MEA)]

The MEA is comprised of an electrolyte membrane, an anode catalyst layer and an anode gas diffusion layer; and a cathode catalyst layer and a cathode gas diffusion layer which are sequentially formed on both sides of the electrolyte membrane. Then, in the electrolyte membrane-electrode assembly, the electrode catalyst of the present invention is used in at least one of the cathode catalyst layer and the anode catalyst layer.

(Catalyst Layer)

A catalyst layer includes an electrode catalyst and an electrolyte.

In the catalyst layer, the catalyst is coated with an electrolyte; however, the electrolyte does not penetrate into the mesopores of the catalyst (support). Therefore, the alloy microparticles on the support surface are brought into contact with the electrolyte; however, the alloy microparticles supported inside the mesopores are in a non-contact state with the electrolyte. As the alloy microparticles inside the mesopores form a three-phase interface with oxygen gas and water in a state of non-contact with the electrolyte, the reaction active area of the alloy microparticles can be secured.

The electrode catalyst of the first embodiment may exist in any of the cathode catalyst layer and the anode catalyst layer; however, it is preferable that the electrode catalyst is used in the cathode catalyst layer. This is because as described above, even if the catalyst of the first embodiment is not brought into contact with the electrolyte, the catalyst can be effectively utilized as the catalyst forms a three-phase interface with water, and water is formed in the cathode catalyst layer.

According to the present embodiment, the catalyst content per unit catalyst-coated area (mg/cm$^2$) is not particularly limited as long as a sufficient degree of dispersibility of the catalyst on the support and sufficient power generation performance can be obtained, and the catalyst content per unit catalyst-coated area is 0.01 to 1 mg/cm$^2$. The platinum content per unit catalyst-coated area is preferably 0.5 mg/cm$^2$ or less. The use of expensive noble metal catalysts represented by platinum, which constitutes the alloy particles, has become a cause for the high price of fuel cells. Therefore, it is preferable to reduce the amount of use of expensive platinum (platinum content) to the above-described range and to reduce the production cost thereby. The lower limit of the platinum content is not particularly limited as long as power generation performance is obtained; however, for example, the lower limit is 0.01 mg/cm$^2$ or more. More preferably, this platinum content is 0.02 to 0.4 mg/cm$^2$. In the present embodiment, alloy particles having high activity can be used by controlling the porous structure of the support, and the activity per weight of the catalyst can be increased. Therefore, it is possible to reduce the amount of use of a highly expensive catalyst.

According to the present specification, for the measurement (confirmation) of the "catalyst (platinum) content per unit catalyst-coated area (mg/cm$^2$)", inductively coupled plasma emission spectrometry (ICP) is used. A method for obtaining the desired "catalyst (platinum) content per unit catalyst-coated area (mg/cm$^2$)" can be easily carried out by those skilled in the art, and the content can be regulated by controlling the composition of the slurry (catalyst concentration) and the coating amount.

The electrolyte is not particularly limited, but it is preferably an ion-conductive polymer electrolyte. Since the polymer electrolyte serves to transfer protons generated in the vicinity of the catalyst active material on a fuel electrode side, the polymer electrolyte is also referred to as a proton conductive polymer.

The polymer electrolyte is not particularly limited, but well-known knowledge in the art can be appropriately referred to. The polymer electrolytes are mainly classified into fluorine-based polymer electrolytes and hydrocarbon-based polymer electrolytes depending on a type of an ion-exchange resin as a constituent material.

As an ion-exchange resin constituting the fluorine-based polymer electrolyte, for example, perfluorocarbon sulfonic acid based polymers such as Nafion (registered trademark, produced by DuPont), Aciplex (registered trademark, produced by Asahi Kasei Co., Ltd.), and Flemion (registered trademark, produced by Asahi Glass Co., Ltd.), perfluorocarbon phosphoric acid based polymers, trifluorostyrene sulfonic acid based polymers, ethylene tetrafluoroethylene-g-styrene sulfonic acid based polymers, ethylene-tetrafluoroethylene copolymers, polyvinylidene fluoride-perfluorocarbon sulfonic acid based polymers, and the like may be exemplified. In terms excellent heat resistance, chemical stability, durability, and mechanical strength, the fluorine-based polymer electrolyte is preferably used, and a fluorine-based polymer electrolyte formed of a perfluorocarbon sulfonic acid based polymer is particularly preferably used.

As a hydrocarbon-based electrolyte, sulfonated polyether sulfones (S-PES), sulfonated polyaryl ether ketones, sulfonated polybenzimidazole alkyls, phosphonated polybenzimidazole alkyls, sulfonated polystyrenes, sulfonated polyether ether ketones (S-PEEK), sulfonated polyphenylenes (S-PPP), and the like may be exemplified. In terms of manufacturing advantages such as inexpensive raw materials, simple manufacturing processes, and high selectivity of materials, a hydrocarbon-based polymer electrolyte is preferably used.

These ion-exchange resins may be singly used, or two or more resins may be used together. In addition, the material is not limited to the above-described material, but another material may be used.

With respect to the polymer electrolyte which serves to transfer protons, proton conductivity is important. In the case where EW of a polymer electrolyte is too large, ion conductivity with in the entire catalyst layer would be decreased. Therefore, the catalyst layer according to the embodiment preferably includes a polymer electrolyte having a small EW. Specifically, catalyst layer according to the embodiment preferably includes a polymer electrolyte having an EW of 1500 g/eq. or less, more preferably includes a polymer electrolyte having an EW of 1200 g/eq. or less, and particularly preferably includes a polymer electrolyte having an EW of 1000 g/eq. or less.

On the other hand, in the case where the EW is too small, since hydrophilicity is too high, water is hard to smoothly move. Due to such a point of view, the EW of polymer electrolyte is preferably 600 g/eq. or more. The EW (Equivalent Weight) represents an equivalent weight of an exchange group having proton conductivity. The equivalent weight is a dry weight of an ion exchange membrane per 1 eq. of ion exchange group, and is represented in units of "g/eq.".

The catalyst layer of the present embodiment may contain a liquid proton conducting material that can connect the catalyst and a polymer electrolyte in a proton-conductive state, between the catalyst and the polymer electrolyte. When the liquid proton conductive material is introduced, a proton transport pathways involving the liquid proton conducting material is secured between the catalyst and the polymer electrolyte, and thus protons needed for power generation can be efficiently transported to the catalyst surface. As a result, the utilization efficiency of the catalyst is increased, and therefore, the amount of use of the catalyst can be reduced while the power generation performance is maintained. It is desirable that this liquid proton conducting material is interposed between the catalyst and the polymer electrolyte, and the liquid proton conducting material can be disposed inside the pores between porous supports (secondary pores) within the catalyst layer, or inside the pores inside porous supports (mesopores or the like; primary pores).

The liquid proton conducting material is not particularly limited as long as the material has ion conductivity and can exhibit a function of forming proton transport pathways between the catalyst and the polymer electrolyte. Specific examples include water, a protic ionic liquid, an aqueous solution of perchloric acid, an aqueous solution of nitric acid, an aqueous solution of formic acid, and an aqueous solution of acetic acid.

In the case of using water as the liquid proton conducting material, since water can wet the catalyst layer by a small amount of liquid water or a humidified gas before power generation is initiated, water can be introduced as a liquid proton conducting material into the catalyst layer. Furthermore, the generated water produced by an electrochemical reaction at the time of operating the fuel cell can be utilized as the liquid proton conducting material. Therefore, in the state of initiation of operation of the fuel cell, it is not necessarily essential to have the liquid proton conducting material maintained. For example, it is desirable that the surface distance between the catalyst and the electrolyte is adjusted to be 0.28 nm or more, which is the ion diameter of oxygen that constitutes a water molecule. By maintaining such a distance, water (liquid proton conducting material) can be inserted between the catalyst and the polymer electrolyte (liquid conducting material retaining portion), while a non-contact state between the catalyst and the polymer electrolyte is maintained. Thus, proton transport pathways made by water between the two are secured.

In a case in which a liquid other than water, such as an ionic liquid, is used as the liquid proton conducting material, it is desirable to disperse the ionic liquid, the polymer electrolyte, and the catalyst in a solution at the time of producing a catalyst ink; however, it is also acceptable to add the ionic liquid at the time of applying the catalyst on the catalyst layer base material.

If necessary, the catalyst layer may contain an additive including a water repellent such as polytetrafluoroethylene, polyhexafluoropropylene, and tetrafluoroethylene-hexafluoropropylene copolymer, a dispersant such as a surfactant, a thickener such as glycerin, ethylene glycol (EG), polyvinyl alcohol (PVA), and propylene glycol (PG), a pore-forming agent, or the like.

A thickness (as a dried thickness) of the catalyst layer is preferably in the range of 0.05 to 30 µm, more preferably in the range of 1 to 20 µm, even more preferably in the range of 2 to 15 µm. The thickness can be applied to both of the cathode catalyst layer and the anode catalyst layer. However, the thickness of the cathode catalyst layer and the thickness of the anode catalyst layer may be equal to or different from each other.

(Electrolyte Membrane)

An electrolyte membrane is formed from, for example, a solid polymer electrolyte membrane. This solid polymer electrolyte membrane has a function of, for example, causing protons produced in the anode catalyst layer to selectively permeate through the cathode catalyst layer along the film thickness direction at the time of operating a fuel cell (PEFC or the like). Furthermore, the solid polymer electrolyte membrane also has a function as a barrier for preventing mixing of the fuel gas that is supplied to the anode side, with the oxidizing gas that is supplied to the cathode side.

The electrolyte material that constitutes the solid polymer electrolyte membrane is not particularly limited, and conventionally known findings can be referred to as appropriate. For example, a fluorine-based polymer electrolyte or a hydrocarbon-based polymer electrolyte described as polymer electrolytes in connection with the catalyst layer described above can be used similarly. At this time, it is not necessary to use the same polymer electrolyte as that used in the catalyst layer.

The thickness of the electrolyte membrane may be determined as appropriate, in consideration of the characteristics of the fuel cell that may be obtained, and there are no particular limitations. The thickness of the electrolyte membrane is usually about 5 to 300 μm. When the thickness of the electrolyte membrane has a value in such a range, a balance between strength at the time of film formation or durability at the time of use and the power output characteristics at the time of use can be adequately controlled.

(Gas Diffusion Layer)

A gas diffusion layer (anode gas diffusion layer 4a, cathode gas diffusion layer 4c) serves to facilitate diffusion of a gas (fuel gas or oxidant gas) supplied through a gas passage (6a, 6c) of a separator to a catalyst layer (3a, 3c) and also serves as an electron conducting path.

A material constituting a substrate of the gas diffusion layers (4a, 4c) is not particularly limited, but well-known knowledge in the related art may be appropriately referred to. For example, a sheet-shaped material having conductivity and porous property such as a fabric made of carbon, a sheet-shaped paper, felt, and a nonwoven fabric may be exemplified. A thickness of the substrate may be appropriately determined by considering characteristics of the obtained gas diffusion layer. The thickness of the substrate may be in the range of about 30 to 500 μm. If the thickness of the substrate is within such a range, balance between mechanical strength and diffusibility of gas, water, and the like can be appropriately controlled.

The gas diffusion layer preferably includes a water repellent for the purpose of preventing a flooding phenomenon or the like by improving water repellent property. The water repellent is not particularly limited, but fluorine-based polymer materials such as polytetrafluoroethylene (PTFE), polyvinylidene fluoride (PVdF), polyhexafluoropropylene, and tetrafluoroethylene-hexafluoropropylene copolymer (FEP), polypropylene, polyethylene, and the like may be exemplified.

In order to further improve water repellent property, the gas diffusion layer may include a carbon particle layer (microporous layer (MPL), not shown) configured with an assembly of carbon particles including a water repellent provided at the catalyst-layer side of the substrate.

Carbon particles included in the carbon particle layer are not particularly limited, but well-known materials in the art such as carbon black, graphite, and expandable graphite may be appropriately employed. Among the materials, due to excellent electron conductivity and a large specific surface area, carbon black such as oil furnace black, channel black, lamp black, thermal black, and acetylene black can be preferably used. An average particle diameter of the carbon particles may be set to be in the range of about 10 to 100 nm. By this, high water-repellent property by a capillary force can be obtained, and contacting property with the catalyst layer can be improved.

As the water repellent used for the carbon particle layer, the above-described water repellent may be exemplified. Among the materials, due to excellent water repellent property and excellent corrosion resistance during the electrode reaction, the fluorine-based polymer material can be preferably used.

A mixing ratio of the carbon particles and the water repellent in the carbon particle layer may be set to be in the range of weight ratio of about 90:10 to 40:60 (carbon particle:water repellent) by taking into consideration balance between water repellent property and electron conductivity. Meanwhile, a thickness of the carbon particle layer is not particularly limited, but it may be appropriately determined by taking into consideration water repellent property of the obtained gas diffusion layer.

(Method of Manufacturing Electrolyte Membrane-Electrode Assembly)

A method of manufacturing a membrane electrode assembly is not particularly limited, and a well-known method in the art may be used. For example, a method which comprises transferring a catalyst layer to a solid polymer electrolyte membrane by using a hot press, or coating a solid polymer electrolyte membrane with a catalyst layer and drying the coating, and joining the resulting laminate with gas diffusion layers, or a method which comprises coating a microporous layer (in the case of not including a microporous layer, one surface of a substrate layer) of a gas diffusion layer with a catalyst layer in advance and drying the resulting product to produce two gas diffusion electrodes (GDEs), and joining both surfaces of the solid polymer electrolyte membrane with the two gas diffusion electrodes by using a hot press can be used. The coating and joining conditions by hot press and the like may be appropriately adjusted according to a type of the polymer electrolyte (perfluorosulfonic acid-based or hydrocarbon-based) in the solid polymer electrolyte membrane or the catalyst layer.

[Separator]

In the case of configuring a fuel cell stack by connecting a plurality of unit fuel cells of polymer electrolyte fuel cells in series, a separator serves to electrically connect the cells in series. The separator also serves as a partition wall for separating a fuel gas, an oxidant gas, and a coolant from each other. In order to secure a passage thereof, as described above, gas passages and coolant passages are preferably installed in each of the separators. As a material constituting the separator, well-known materials in the art of carbon such as dense carbon graphite and a carbon plate, a metal such as a stainless steel, or the like can be employed without limitation. A thickness or size of the separator, a shape or size of the installed passages, and the like are not particularly limited, but they can be appropriately determined by taking into consideration desired output characteristics and the like of the obtained fuel cell.

A manufacturing method for the fuel cell is not particularly limited, and well-known knowledge in the art in the field of fuel cell may be appropriately referred to.

Furthermore, in order that the fuel cell can generate a desired voltage, a fuel cell stack may be formed by connecting a plurality of membrane electrode assemblies in series through a separator. A shape and the like of the fuel cell are not particularly limited, and they may be appropriately determined so as to obtain desired cell characteristics such as a voltage.

The above-described PEFC or membrane electrode assembly uses the catalyst layer having excellent power generation performance and excellent durability. Therefore, the PEFC or membrane electrode assembly shows excellent power generation performance and durability.

The PEFC according to the embodiment and the fuel cell stack using the PEFC can be mounted on a vehicle, for example, as a driving power source.

EXAMPLE

The effects of the present invention will be described with reference to the following Examples and Comparative Examples. However, the scope of the present invention is not limited to the Examples. Unless otherwise specified, each operation is performed at a room temperature (25° C.) and a relative humidity of 40 to 50%.

Synthesis Example 1

Support A was produced by the method described in WO 2009/075264 A. Support A had a specific surface area of 1,570 m$^2$/g, a mode radius of pore distribution of mesopores of 1.2 nm, and a pore volume of mesopores of 0.73 cc/g.

Synthesis Example 2

The support A produced in Synthesis Example 1 was heated up to 1,800° C. in an argon atmosphere, and then the support was maintained at this temperature for 8 minutes.

Support B thus obtained had a BET specific surface area of 1,200 m$^2$/g, a mode radius of pore distribution of mesopores of 1.65 nm, and a pore volume of mesopores of 0.63 cc/g.

Synthesis Example 3: Corresponding to Synthesis Example 2 in WO 2014/175106 A

A composite obtained by mixing magnesium oxide having an average crystallite size of 5 nm with a thermoplastic resin at a weight ratio of 2:8, was heat-treated at 900° C. in a nitrogen atmosphere, and then the resultant thus obtained was washed with dilute sulfuric acid and was dried. Thus, support C was produced. Support C had a specific surface area of 1,600 m$^2$/g, a mode diameter of mesopores of 2.4 nm, and a pore volume of mesopores of 0.87 cc/g.

Synthesis Example 4: Corresponding to Synthesis Example 1 in WO 2014/175106 A

A composite obtained by mixing magnesium oxide having an average crystallite size of 10 nm with a thermoplastic resin at a weight ratio of 3:7, was heat-treated at 900° C. in a nitrogen atmosphere, and then the resultant thus obtained was washed with dilute sulfuric acid and was dried. Thus, support D was produced. Support D had a specific surface area of 1,300 m$^2$/g, a mode diameter of mesopores of 6.1 nm, and a pore volume of mesopores of 0.45 cc/g.

Example 1

1. Step (1): Production of Platinum Particle-Supported Support 19 g of support A was immersed in 1,000 g of an aqueous solution of dinitrodiammineplatinum nitrate having a platinum concentration of 0.8% by weight (platinum content: 8 g), the mixture was stirred, and then 100 ml of 100% methanol as a reducing agent was added thereto. This solution was stirred and mixed for 7 hours at the boiling point (about 95° C.), and platinum was supported on the support. The resultant was filtered and dried, and thereby a platinum particle-supported support was obtained. The platinum loading concentration (loading amount) of this platinum particle-supported support was 24.5% by weight with respect to the support. The loading concentration was measured by an ICP analysis.

2. Step (A): Hydrophilization Treatment Step 20 g of the platinum particle-supported support obtained as described above was added to 2 L of a 1.0 mol/L aqueous solution of nitric acid, and the mixture was stirred. Subsequently, while stirring was maintained, the mixture was heated for 2 hours at 95° C. After the mixture was heat-treated, the mixture was cooled to room temperature, and thus a hydrophilization-treated platinum particle-supported support liquid was obtained (amount of bonded hydrophilic groups: 1.2 mmol/g).

3. Step (2): Cobalt Alloying Step

Sodium hydroxide was added to the hydrophilization-treated platinum particle-supported support liquid obtained as described above, the pH was adjusted to 2, and then a cobalt precursor (cobalt sulfate, cobalt content: 1.6 g) was introduced therein. To this, the entire amount of a reducing agent solution (10 g of sodium borohydride was dissolved in 1 L of pure water) separately produced was introduced, and the mixture was stirred and mixed with a stirrer for one hour at room temperature. Thus, reduction and precipitation were achieved. Then, the precipitate was filtered and dried, and then an alloying treatment was carried out for one hour at 800° C. in a 100 vol % hydrogen gas. Thus, an electrode catalyst was produced. The loading concentration (loading amount) of the catalytic metals of this electrode catalyst was 30.6% by weight (Pt: 29.0% by weight, Co: 1.6% by weight).

Example 2

A platinum particle-supported support was obtained in the same manner as in Step (1) of Example 1, except that support B was used instead of the support A used in Step (1) of Example 1. This support was maintained for one hour at a temperature of 900° C. in a 100 vol % hydrogen gas, and the support thus obtained was used as the platinum particle-supported support. The platinum loading concentration (loading amount) of this platinum particle-supported support was 29.7% by weight with respect to the support. The platinum particle-supported support thus obtained was subjected to a hydrophilization treatment in the same manner as in Example 1, and thus a hydrophilization-treated platinum particle-supported support was obtained.

Sodium hydroxide was added to the hydrophilization-treated platinum particle-supported support liquid obtained as described above so as to adjust the pH to 2, and then a cobalt precursor (cobalt sulfate, cobalt content: 4.8 g) was introduced thereto. To this, the entire amount of a reducing agent solution (15 g of sodium borohydride was dissolved in 1 L of pure water) separately produced was introduced, and the mixture was stirred and mixed with a stirrer for one hour at room temperature. Thus, reduction and precipitation were achieved. Then, the precipitate was filtered and dried, and then an alloying treatment was carried out for one hour at 800° C. in a 100 vol % hydrogen gas. Thus, an electrode catalyst was produced. The loading concentration (loading amount) of the catalytic metals of this electrode catalyst was 31.8% by weight (Pt: 29.9% by weight, Co: 1.9% by weight).

Example 3

An electrode catalyst was produced in the same manner as in Example 2, except that in regard to Step (1) of Example 2, 8 g of support B was immersed in 1,000 g of an aqueous solution of dinitrodiammineplatinum nitrate having a platinum concentration of 0.8% by weight (platinum content: 8 g), and a platinum particle-supported support (platinum loading concentration (loading amount): 49.4% by weight with respect to the support) was obtained. The loading concentration (loading amount) of the catalytic metals of this electrode catalyst was 54.4% by weight (Pt: 49.3% by weight, Co: 5.1% by weight) with respect to the support.

Example 4

The electrode catalyst obtained in Example 3 was subjected to a heat treatment process for 120 minutes at 600° C. in a hydrogen gas atmosphere. The extent of ordering was measured for this electrode catalyst, and the extent of ordering was 49%. Furthermore, the loading concentration (loading amount) of the catalytic metals of this electrode catalyst was 58.1% by weight (Pt: 52.7% by weight, Co: 5.4% by weight) with respect to the support.

Comparative Example 1

An electrode catalyst was produced in the same manner as in Example 1, except that a hydrophilization treatment was not carried out in regard to Example 1. The loading concentration (loading amount) of the catalytic metals of this electrode catalyst was 29.6% by weight (Pt: 27.7% by weight, Co: 1.9% by weight) with respect to the support.

Comparative Example 2

The platinum particle-supported support obtained in Step (1) of Example 1 was maintained for one hour at a temperature of 900° C. in a 100 vol % hydrogen gas, and the platinum particle-supported support thus obtained was used as an electrode catalyst. The platinum loading concentration (loading amount) of this platinum particle-supported support was 30.4% by weight with respect to the support.

(Comparative Example 3): Corresponding to Comparative Example 1 of WO 2014/175106 A 12 g of support C produced in Synthesis Example 3 was immersed in a solution containing platinum, and the mixture was stirred. Next, this solution was stirred and mixed for 7 hours at the boiling point (about 95° C.), and then the mixture was filtered and dried. Thus, a platinum particle-supported support was produced. The solution containing platinum used at this time was 1,000 g of a dinitrodiammineplatinum nitrate having a platinum concentration of 0.8% by weight (platinum content: 8 g).

Next, 10 g of the platinum particle-supported support obtained as described above was immersed in a solution containing cobalt, and the mixture was stirred for one hour. Next, this solution was dried at 60° C., and thereby a second supported support was produced. The solution containing cobalt used at this time was 60 g of an aqueous solution of cobalt chloride having a cobalt concentration of 0.66% by weight (cobalt content: 0.4 g).

Lastly, an electrode catalyst was produced by performing an alloying treatment for 2 hours at 1,000° C. in a 100% hydrogen gas. The loading concentration (loading amount) of the catalytic metals of this electrode catalyst was 30.6% by weight (Pt: 28.7% by weight, Co: 1.9% by weight) with respect to the support.

(Comparative Example 4): Corresponding to Example 1 of WO 2014/175106 A

A catalyst was produced in the same manner as in Comparative Example 3, except that support D produced in Synthesis Example 4 was used. The loading concentration (loading amount) of the catalytic metals of this electrode catalyst was 30.6% by weight (Pt: 27.8% by weight, Co: 2.8% by weight) with respect to the support.

(Evaluation Method)

1: Production of Rotating Electrode (RDE) for Performance Evaluation

Each of the electrode catalysts of Examples and Comparative Examples was uniformly dispersed and supported, together with NAFION, on a rotating disc electrode (geometrical area: 0.19 cm$^2$) formed from a glassy carbon disc having a diameter of 5 mm, such that the loading amount of platinum per unit area would be 34 μg/cm$^2$. Thus, an electrode for performance evaluation was produced.

2. Production of Membrane Electrode Assembly

Each catalyst powder produced as described above and an ionomer dispersion liquid (NAFION (registered trademark) D2020, EW=1,100 g/eq (g/mol), manufactured by DuPont Company) as a polymer electrolyte were mixed such that the weight ratio of the polymer electrolyte with respect to the carbon support would be 0.9. Furthermore, a solvent of water:n-propyl alcohol=6:4 (weight ratio) was added to the mixture so as to obtain a percentage solid content (Pt+ carbon support+polymer electrolyte) of 7% by weight, and thus a cathode catalyst ink was produced.

Ketjen black (particle size: 30 to 60 nm) was used as a support, and platinum (Pt) having an average particle size of 2.5 nm as a catalytic metal was supported on this support such that the loading ratio would be 50% by weight. Thus, a catalyst powder was obtained. This catalyst powder and an ionomer dispersion liquid (NAFION (registered trademark) D2020, EW=1,100 g/eq (g/mol), manufactured by DuPont Company) as a polymer electrolyte were mixed such that the weight ratio of the polymer electrolyte with respect to the carbon support would be 0.9. Furthermore, a normal propyl alcohol solution (50%) as a solvent was added to the mixture so as to obtain a percentage solid content (Pt+carbon support+ionomer) of 7% by weight, and thus an anode catalyst ink was produced.

Next, gaskets (manufactured by DuPont Teijin Films, TEONEX: 25 μm (adhesive layer: 10 μm)) were disposed around both surfaces of a polymer electrolyte membrane (manufactured by DuPont Company, NAFION NR211, thickness: 25 μm). Next, the cathode catalyst ink was applied into a size of 5 cm×2 cm on an exposed part of one surface of the polymer electrolyte membrane by a spray coating method. The catalyst ink was dried by maintaining stage for performing spray coating at 60° C. for 1 minute, and a cathode catalyst layer having a film thickness (dried film thickness) of 10 μm was obtained. The platinum loading amount at this time was 0.15 mg/cm$^2$. Next, an anode catalyst layer having a film thickness (dried film thickness) of 10 μm was formed similarly to the cathode catalyst layer by performing spray coating and a heat treatment on the electrolyte membrane.

The two surfaces of the laminate thus obtained were sandwiched between gas diffusion layers (24BC, manufactured by SGL Carbon SE), and thus a membrane electrode assembly (MEA) was obtained.

<Measurement of Mass Specific Activity (MEA)>

For each of the membrane electrode assemblies, the power generation current per alloy weight (μA/g (Pt)) at 0.9 V under the following evaluation conditions was measured, and thus an oxygen reduction activity evaluation was carried out.

[Chem. 3]
<Evaluation Conditions>
  Temperature: 80° C.
  Gas component: Hydrogen (anode side)/oxygen (cathode side)
  Relative humidity: 100% RH/100% RH
  Pressure: 150 kPa (abs)/150 kPa (abs)
  Voltage scanning direction: Anode <Measurement of Area Specific Activity (MEA)>

Regarding the area specific activity per platinum surface area, the current value at a potential of 0.9 V was measured under conditions similar to those for the measurement of the mass specific activity, and the value of the area specific activity was obtained by dividing this current value by the effective catalyst surface area. Meanwhile, the measurement of the effective catalyst surface area was carried out by sweeping the potential of the object of measurement under the conditions described in Table 2, and calculating the effective catalyst surface area from the amount of electricity caused by adsorption of protons to the catalytic metals.

TABLE 2

Conditions for evaluation of effective catalyst surface area

| | |
|---|---|
| Cell temperature | 80° C. |
| Scanning potential range | 0.02 to 0.9 V |
| Scan rate | 50 mV/s |
| Number of cycles | 3 cycle |
| Supplied gas (counter electrode/working electrode) | $H_2/N_2$ |
| Humidity (counter electrode/working electrode) | 100% RH/ 100% RH |

<Measurement of Area Specific Activity (RDE)>

Each of the rotating electrodes (RDE) for performance evaluation of Examples and Comparative Examples was subjected to cyclic voltammetry in 0.1 M perchloric acid at 25° C. saturated with $N_2$ gas, at a scan rate of 50 mVs$^{-1}$ over a potential range of 0.05 to 1.2 V against a reversible hydrogen electrode (RHE). From the area of a hydrogen adsorption peak shown at 0.05 to 0.4 V of a voltammogram thus obtained, the electrochemical surface area (cm$^2$) of each electrode catalyst was calculated.

Next, a scan of voltage was carried out in a 0.1 M perchloric acid at 25° C. saturated with oxygen from 0.2 V to 1.2 V at a rate of 10 mV/s using an electrochemical analyzer. Furthermore, the influence of mass transfer (oxygen diffusion) was corrected from the current obtained by the scan of potential, using the Koutecky-Levich formula, and then the current value at 0.9 V was extracted. Then, a value obtained by dividing the obtained current value by the electrochemical surface area was designated as area specific activity (µAcm$^{-2}$). A method of using the Koutecky-Levich formula is described in, for example, Electrochemistry Vol. 79, No. 2, p. 116-121 (2011) "Analysis of oxygen reduction reaction on 4 Pt/C catalyst" of (hydrodynamic voltammogram (1) oxygen reduction (RRDE)). The area specific activity is calculated by dividing the current value thus extracted at 0.9 V by the electrochemical surface area.

The production conditions, physical properties, and evaluation results for various catalysts are shown in the following Table 3.

TABLE 3-1

Support (before supporting of alloy microparticles)

| Support type | BET specific surface area (m$^2$/g of support) | Mode diameter of mesopores (nm) | Pore volume of mesopores (cc/g of support) |
|---|---|---|---|
| A | 1570 | 1.20 | 0.73 |
| B | 1200 | 1.65 | 0.63 |
| C | 1600 | 2.4 | 0.87 |
| D | 1300 | 6.1 | 0.45 |

TABLE 3-2

Catalyst characteristics

| | Metal loading concentration wt % | Pt loading concentration wt % | Co loading concentration wt % | Molar content ratio of platinum with respect to non-platinum metal (entire catalyst) | Mode diameter of mesopores (nm) | Pore volume of mesopores (cc/g of support) |
|---|---|---|---|---|---|---|
| Example 1 | 30.6 | 29.0 | 1.6 | 5.5 | 1.2 | 0.70 |
| Example 2 | 31.8 | 29.9 | 1.9 | 4.8 | 1.65 | 0.60 |
| Example 3 | 54.4 | 49.3 | 5.1 | 2.9 | 1.65 | 0.44 |
| Example 4 | 58.1 | 52.7 | 5.4 | 2.9 | 1.65 | 0.44 |
| Comparative Example 1 | 29.6 | 27.7 | 1.9 | 4.4 | 2.1 | 0.70 |
| Comparative Example 2 | 30.4 | 30.4 | 0 | — | 1.65 | 0.61 |
| Comparative Example 3 | 30.6 | 28.7 | 1.9 | 4.5 | 2.1 | 0.84 |
| Comparative Example 4 | 30.6 | 27.8 | 2.8 | 3.0 | 6.1 | 0.41 |

Catalyst characteristics

| | Molar content ratio of platinum with respect to non-platinum metal (inside mesopores) | Average diameter of alloy microparticles inside mesopores nm | Extent of ordering % | Mass specific activity (MEA) (AgPt-1) | Area specific activity (MEA) (µA cmPt-2) | Area specific activity (RDE) (µA cmPt-2) |
|---|---|---|---|---|---|---|
| Example 1 | 8.5 | 2.3 | 0 | 327 | 1040 | — |
| Example 2 | 5.4 | 4.0 | 0 | 508 | 1524 | — |
| Example 3 | 2.8 | 4.6 | 0 | 419 | 1454 | 2056 |
| Example 4 | 2.8 | 4.9 | 49 | — | — | 2928 |

TABLE 3-2-continued

| | | | | | | |
|---|---|---|---|---|---|---|
| Comparative Example 1 | ∞ | 3.2 | 0 | 302 | 793 | — |
| Comparative Example 2 | — | 3.4 | 0 | 312 | 818 | — |
| Comparative Example 3 | ∞ | 3.7 | 0 | 201 | 639 | — |
| Comparative Example 4 | 4.6 | 4.3 | 0 | 279 | 845 | — |

From the results described above, the MEAs that used the catalysts of Examples 1 to 3 exhibited higher area specific activity and higher mass specific activity than the MEAs that used the catalysts of Comparative Examples 1 to 3, which did not have the alloy composition ratio as defined in the present invention in the mesopores. Furthermore, the MEA that used the catalyst of Comparative Example 4 had the alloy composition ratio defined in the present invention; however, since the mode radius of pore distribution of mesopores was 2.5 nm or more, the MEA exhibited low area specific activity and low mass specific activity. Furthermore, it was found from a comparison between Example 3 and Example 4 that a catalyst having an extent of ordering of 30% to 100% has superior catalytic activity.

The present patent application is based on Japanese Patent Application No. 2016-083843, filed on Apr. 19, 2016, the entire disclosure of which is incorporated here by reference.

The invention claimed is:

1. An electrode catalyst in which catalytic metals are supported on a catalyst support,
    wherein the catalytic metals include platinum and a metal component other than platinum,
    the electrode catalyst has mesopores having a radius of 1 nm or more, with a mode radius of pore distribution of the mesopores being 1 nm or more and less than 2.5 nm,
    alloy microparticles of platinum and the metal component other than platinum are supported inside the mesopores, and
    a molar content ratio of platinum with respect to the metal component other than platinum in the alloy microparticles supported inside the mesopores is 1.0 to 10.0.

2. The electrode catalyst according to claim 1, wherein the electrode catalyst has a pore volume of the mesopores of 0.4 cc/g of the support or more.

3. The electrode catalyst according to claim 1, wherein the alloy microparticles supported inside the mesopores have an average diameter of 2.0 nm or more.

4. The electrode catalyst according to claim 1, wherein the alloy microparticles in the electrode catalyst have, as an internal structure, an intermetallic compound structure having platinum atoms and metal atoms other than platinum arranged with regularity.

5. The electrode catalyst according to claim 4, wherein the alloy microparticles in the electrode catalyst have an $L1_2$ structure, and the $L1_2$ structure has an extent of ordering of 30% to 100%.

6. The electrode catalyst according to claim 1, wherein the metal component other than platinum is cobalt (Co).

7. A membrane electrode assembly comprising the electrode catalyst according to claim 1 and an electrolyte.

8. A fuel cell comprising the membrane electrode assembly according to claim 7.

* * * * *